United States Patent
Mori et al.

(10) Patent No.: US 7,101,523 B2
(45) Date of Patent: Sep. 5, 2006

(54) SILICA

(75) Inventors: Yutaka Mori, Fukuoka (JP); Hanako Kato, Fukuoka (JP); Katsuya Funayama, Fukuoka (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 10/255,140

(22) Filed: Sep. 25, 2002

(65) Prior Publication Data

US 2005/0047985 A1 Mar. 3, 2005

(30) Foreign Application Priority Data

| Sep. 25, 2001 | (JP) | ............................. 2001-291966 |
| Sep. 25, 2001 | (JP) | ............................. 2001-291967 |
| Sep. 25, 2001 | (JP) | ............................. 2001-291968 |
| Sep. 25, 2001 | (JP) | ............................. 2001-291969 |
| Sep. 25, 2001 | (JP) | ............................. 2001-291970 |
| Sep. 26, 2001 | (JP) | ............................. 2001-293484 |
| Nov. 22, 2001 | (JP) | ............................. 2001-358567 |
| Nov. 22, 2001 | (JP) | ............................. 2001-358568 |
| Dec. 12, 2001 | (JP) | ............................. 2001-379228 |

(51) Int. Cl.
*C01B 33/32* (2006.01)

(52) U.S. Cl. ...................... 423/338; 423/335

(58) Field of Classification Search ........ 423/335–336, 423/338
See application file for complete search history.

(56) References Cited

U.S. PATENT DOCUMENTS

| 5,307,821 A * | 5/1994 | Misuda et al. ............... 131/290 |
| 5,750,258 A * | 5/1998 | Sakai et al. .................. 428/405 |
| 6,838,068 B1 * | 1/2005 | Katsuro et al. ............. 423/338 |
| 2002/0018743 A1 * | 2/2002 | Katsuro et al. ............. 423/338 |

FOREIGN PATENT DOCUMENTS

| EP | 0 653 378 | 5/1995 |
| EP | 0653378 A1 * | 5/1995 |
| JP | 62-113713 | 5/1987 |
| JP | 09-30809 | 2/1997 |
| JP | 2000-281330 | 10/2000 |

OTHER PUBLICATIONS

Seong Su Kim, et al., "Ultrastable Mesostructured Silica Vesicles" Science, (www.sciencemag.org) vol. 282, Nov. 13, 1998: pp. 1302-1305.
Chinese Office Action dated Mar. 5, 2004.

* cited by examiner

*Primary Examiner*—Colleen P. Cooke
(74) *Attorney, Agent, or Firm*—Katten Muchin Rosenman LLP

(57) ABSTRACT

Silica with a large pore volume, a large specific surface area, a narrow pore distribution, low contents of unwanted metal impurities, and excellent physical properties such as high heat-resistance and water-resistance is provided. The silica has a mode pore diameter ($D_{max}$) of 20 nm or less, and a solid-state Si nuclear magnetic resonance (hereinafter called solid-state Si NMR) spectrum of the silica includes a chemical shift ($\delta$ ppm) of $Q^4$ peak meeting the following inequality (I).

$$-0.0705 \times (D_{max}) - 110.36 > \delta \qquad (I)$$

The silica with such properties can be suitably used in fields of which particularly excellent heat resistance and water resistance are required, and moreover controlled pore properties, and the fact that physical properties scarcely change over a long period of time are required among the above-mentioned applications.

28 Claims, 2 Drawing Sheets

Relations between Aging Time and Fracture Stress of Silica Hydrogel

SILICA

BACKGROUND OF THE INVENTION (1) Field of the Invention

The present invention relates to novel silica having desirable properties such as high heat-resistance and high water-resistance.

(2) Description of Related Art

Silica has been used as a desiccant for a long time. In recent years, silica has also found its utility as a catalyst carrier, a separating agent, an adsorbent and the like, upon which various different features are demanded for silica. Features of silica depend on various properties such as its specific surface area, pore diameter, pore volume, pore diameter distribution, etc. Such properties are greatly affected by conditions under which silica is produced.

"Silica" means both silicic acid anhydride and silicic acid hydrate. Examples of silicic acid anhydride include quartz, tridymite, cristobalite, coesite, stishovite, quartz glass, etc., while examples of silicic acid hydrate include the so-called amorphous "silica gel", which is obtained by gelating silica hydrosol and drying the resultant hydrogel. The latter examples also include colloidal silica, silicate oligomer, and silica of the type which is formed using an organic compound or the like as a template (the so-called micelle template type silica), for example, MCM-41 Exxon Mobil Corporation. "Silica gel" can be made from raw materials such as water glass and alkoxysilane.

According to a general method, silica gel is produced by hydrolysis of alkali silicate, such as sodium silicate, with mineral acid followed by gelation and drying of the resultant silica hydrosol. Many suggestions have been made relating to the above production method in order to improve features of silica gel product.

For example, Japanese Patent Laid-Open publication No. SHO 62-113713 discloses a method for producing silica gel with a narrow pore diameter distribution. In this method, alkali silicate solution is hydrolyzed with mineral acid to form silica hydrosol. The hydrosol is gelated and the resultant hydrogel is treated with acid solution whose pH value is 2.5 or less. Then the hydrogel is washed with water and treated with buffer solution so that the pH value of the hydrogel settles within 4–9, and then undergoes hydrothermal treatment.

Japanese Patent Laid-Open publication No. HEI 9-30809 refers to a method of batch fluidized drying of silica hydrogel followed by hydrothermal treatment.

These production methods succeeded in modifying capability of silica gel product to some extent: the pore diameter distribution became sharper. Still, they failed in improving other properties such as its specific surface area, each diameter and the total volume of its pores significantly, and also failed in providing the silica gel product having desirable properties because of its poor heat-resistance and water-resistance.

Additionally, according to the method described in the former publication (SHO 62-113713), the resultant silica generally contains a considerable amount of impurities, such as sodium, magnesium, titanium, aluminum, zirconium, etc., which are derived from alkali silicate being raw material. Even a minute total amount (e.g., few hundred ppm) of such impurities remarkably affects on properties of silica product, for example, in the following three ways: (1) such impurities accelerates crystallization of silica gel at high temperature; (2) such impurities also promote hydrothermal treatment of silica gel with water, resulting in enlargement of the pore diameter, the pore volume and the pore diameter distribution and in reduction in the specific surface area of the silica gel product; and (3) since the presence of such impurities lowers the sintering temperature, calcination of silica gel containing such impurities easily reduces the specific surface area of the silica gel. In particular, alkali metal impurities and alkaline-earth metal impurities cause these effects more readily than other impurities. Besides, silica gel including titanium or aluminum impurities at the silica surface or among siloxane bonds has an increased number of acid sites, causing undesired catalysis when used as a catalyst carrier or an adsorbent.

Examples of the method for producing pure silica gel with little contents of impurities include a method of purifying gel obtained by neutralization of alkali silicate and a method using silicon alkoxide as a raw material. Especially the latter method can give very pure silica gel with less difficulty by purifying the raw material, silicon alkoxide, using technique such as distillation.

The method using silicon alkoxide as a raw material usually includes (i) hydrolysis and condensation process, in which the silicon alkoxide is hydrolyzed into silica hydrosol in the presence of a catalyst and the silica hydrosol is condensed to form silica hydrogel, and (ii) property control process, in which the resultant silica hydrogel is transformed through hydrothermal treatment into silica gel with controlled properties. In (i) hydrolysis and condensation process, acid (sulfuric acid, hydrochloric acid, or nitric acid) is generally used as the catalyst. Additionally, between (i) hydrolysis and condensation process and (ii) property control process, aging process is commonly carried out to intend the improvement of properties (e.g., the hardness) of silica gel product. The above method is called sol-gel method, which is known to the art.

However, silica gel made from silicon alkoxide through sol-gel method generally has a small mean pore diameter and a wide pore diameter distribution. In addition, it is not reported that hydrothermal treatment of silica gel prepared by sol-gel method improves properties of the silica gel significantly.

By the way, Kim et al. (Ultrastable Mesostructured Silica Vesicles Science, 282, 1302 (1998)) disclosed the method of producing a mesoporous molecular sieve with heat-resistance (up to 1000° C.) and water-resistance (at 100° C. for longer than 150 hours) by forming supramolecular structure of electroneutral (non-charged) Gemini surfactant and silica precursor bound with hydrogen bonds and then removing the Gemini surfactants from the supramolecular structure. Kim's method, being a kind of micelle-templated silica technique which forms porous silica product using an organic template, can produce silica with a sharper pore diameter distribution than that produced by the foregoing other methods. However, Kim's method gives inadequate water-resistance to the produced silica, and has complicated processes that result in low productivity.

Macrostructure of silica is well known to the art as continuous three-dimensional structure of spherical particles of silica colloid tightly knitted together, whereas microstructure of silica gel has not yet been fully elucidated. It is therefore expected that analysis of such microstructure of silica lead to finding of a new kind of silica, that fulfills various desired properties with sufficient balance, out of various kinds of silica with previously unknown microstructure.

SUMMARY OF THE INVENTION

With the foregoing problems in view, it is an object of the present invention to provide a new kind of silica, having previously unknown microstructure, a large total pore volume, a large specific surface area, a narrow pore diameter distribution, low contents of unwanted metal impurities, and excellent physical properties such as high heat-resistance and water-resistance, namely, possesses various kinds of desirable characteristics with sufficient balance.

The present inventors have conducted extensive studies to address the foregoing problems and, as a result, have found that when hydrolysis and condensation process of silicon alkoxide is completed, by immediately carrying out property control process without aging process, it is possible to obtain silica with unique structure characterized by measurement of solid state Si NMR etc. The inventors also found that the obtained silica has desirable characteristics such as high heat-resistance and water-resistance and that it is possible to control pore properties precisely, thus having accomplished the present invention.

According to an aspect of the present invention, there is provided a silica having a mode pore diameter ($D_{max}$) of 20 nm or less, wherein a solid-state nuclear magnetic resonance (hereinafter called NMR) spectrum of said silica includes a chemical shift ($\delta$ ppm) of $Q^4$ peak meeting the following inequality (I).

$$-0.0705 \times (D_{max}) - 110.36 > \delta \quad (I)$$

With this feature, the subject silica has a high adsorption and absorption capacity because of its relatively small mode pore diameter ($D_{max}$) as compared with the conventional silica, high productivity, and high heat-resistance and water-resistance because of its well-ordered form with little distortion.

Among all various kinds of silica, the present invention is highly effective when applied especially to "silica gel", micelle-templated silica, and the like.

DETAILED DESCRIPTION OF THE INVENTION

Figure 1:
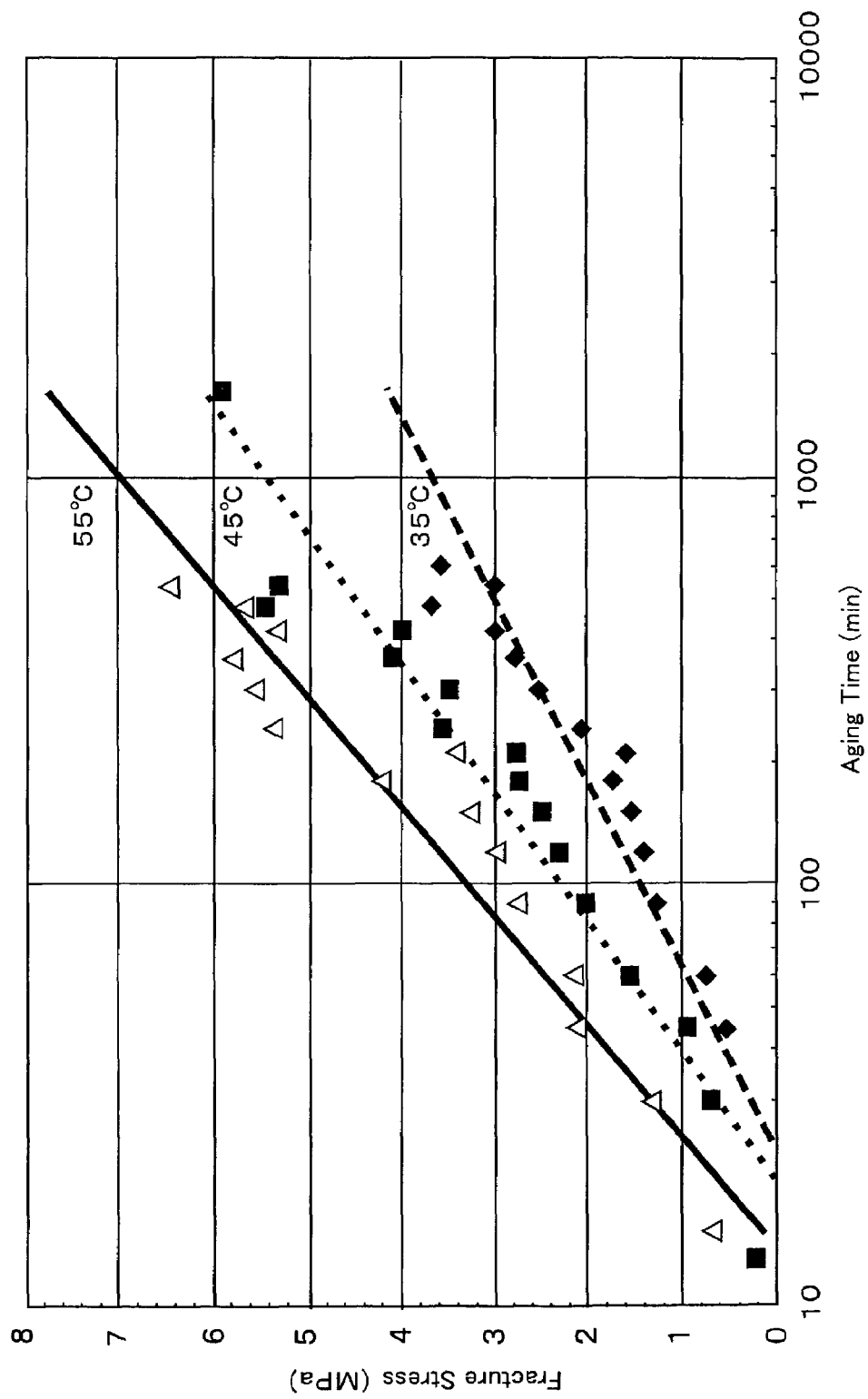
FIG. 1 is a graph showing relations between aging time and fracture stress of silica hydrogel when aged at temperatures of 35° C., 45° C., and 55° C.

The present invention will hereinafter be described in detail.

(1) Characteristics of Silica According to Present Invention

Silica according to the present invention is silicic acid hydrate expressed by the rational formula $SiO_2\text{-}nH_2O$.

One of the characteristics of the silica according to the present invention is its mode pore diameter ($D_{max}$) smaller than that of the conventional silica gel. The mode pore diameter ($D_{max}$) is a property affecting adsorption and absorption of gas and liquid: as the mode pore diameter ($D_{max}$) is smaller, the silica has the higher capacity of adsorption and absorption at even lower pressure of those gas or liquid. Thus, above various properties, the mode diameter ($D_{max}$) is an important physical property especially for silica used for a catalyst carrier and an adsorbent. Specifically, the mode diameter ($D_{max}$) of the silica according to the present invention is usually 20 nm or less, preferably 17 nm or less, more preferably 15 nm or less. It has no particular lower limit, although being usually 2 nm or more.

The above-mentioned mode diameter ($D_{max}$) is obtained from a desorption isotherm measured by adsorption and desorption of a nitrogen gas (BET method), by plotting a pore diameter distribution curve calculated according to BJH method, which is described in E. P. Barrett, L. G. Joyner, P. H. Haklenda, J. Amer. Chem. Soc., vol. 73, 373 (1951). The pore diameter distribution curve means a differential pore volume, namely, a differential nitrogen-gas absorption amount ($\Delta V/\Delta(\log d)$) to pore diameter d (nm), where V is an absorption volume of a nitrogen gas.

Preferably the silica according to the present invention is amorphous in its three-dimensional structure, namely, it has no crystalline-like structure. To put it in another way, X-ray diffraction analysis of the silica according to the present invention shows substantially no crystalline peak. Throughout the present specification, silica that is not amorphous means the silica that shows at least one peak attributable to crystalline structure at over 6 angstrom (Å Units d-spacing) in an X-ray diffraction pattern. The amorphous silica is especially excellent in productivity compared with the crystalline silica.

Besides, the silica according to the present invention has a well-ordered form with little distortion as one of its characteristics. Structural distortion of silica is represented by a chemical shift value of $Q^4$ peak in solid-state Si nuclear magnetic resonance (hereinafter called solid-state Si NMR) measurement. The following description will be made specifically on the relation between structural distortion of silica and a chemical shift value of $Q^4$ peak.

The silica according to the present invention, which is expressed by the rational formula above, has a network structure in which each vertex of tetrahedron of a Silica atom (Si) is bonded to an Oxygen atom (O), and the O is further bonded to another Si, and so forth to thereby spread out. In a repeating unit (Si—O—Si—O— . . . ) of the structure, some of (O)s are substituted with other members (for example, —OH, —OCH$_3$, etc.), so that the respective Si can be classified as one of four types, namely, Si bonded to four (—O—Si)s ($Q^4$) as expressed by the following formula (A), Si bonded to three (—O—Si)s ($Q^3$) as expressed by the following formula (B), and so forth (the following formulas (A) and (B), network structure of (Si—O) is shown in plane view while leaving the tetrahedron structure described-above out of account). In the solid-state Si NMR measurement, peaks attributable to the four types of Si, respectively, are called in turn $Q^4$ peak, $Q^3$ peak, . . . .

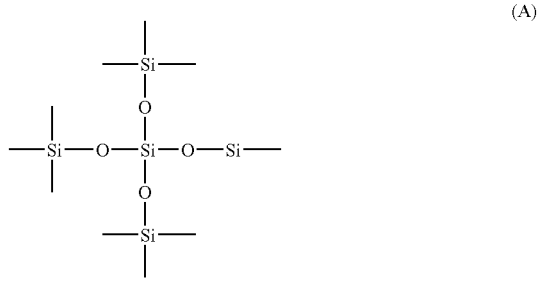

(A)

-continued

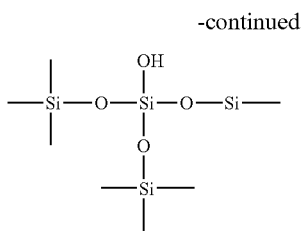
(B)

The especially important characteristic of the silica according to the present invention is in that a chemical shift value δ (ppm) of the $Q^4$ peak satisfies the following inequality (I).

$$-0.0705 \times (D_{max}) - 110.36 > \delta \qquad (I)$$

The fact means that there is little distortion in a bond angle, which is defined by two (—OSi)s bonded to each Si.

The above-mentioned chemical shift value δ (ppm) of the $Q^4$ peak is generally larger than the value calculated according to the left side of the inequality (I). It is therefore understood that the silica according to the present invention has a smaller chemical shift value of $Q^4$ peak than that of the conventional silica. To put it in other words, the chemical shift of the silica according to the present invention is in relatively high magnetic field, indicating that the above-mentioned bond angle is well ordered, with little distortion. It is preferable that in the present invention, the chemical shift value δ of the $Q^4$ peak of the silica is larger than the value calculated according to the left side of the inequality (I) ($-0.0705 \times (D_{max}) - 110.36$) by usually 0.05% or more, especially 0.1% or more, further especially 0.15% or more.

Besides, the chemical shift value δ of the $Q^4$ peak is generally observed within the range between −106.00 and −113.00 ppm for the conventional silica, whereas it is preferably observed in a smaller region for the silica according to the present invention, specifically within the range between −111.00 and −112.00 ppm. This characteristic also indicates that the bond angle is well ordered, with little distortion in the silica according to the present invention. Incidentally, the reason why $Q^4$ peak has a certain range of value, as described above, is that the bond angle defined by two (—OSi)s with respect to the observed Si generally takes various values.

The relation between excellent heat-resistance or water-resistance of the silica according to the present invention and the structural distortion as described above is not always clear but is presumed as follows: since silica is composed of aggregated spherical particles in various sizes (1–100 nm), when it has the well-ordered structure with little distortion as described above, the whole spherical particle keeps high homogeneity in its microstructure, thereby exhibiting excellent heat-resistance or water-resistance. Such structural distortion of silica scarcely appears in the $Q^3$ peak or less ($Q^2$, $Q^1$, . . . ) because the spreading of the network structure of Si—O of $Q^3$ and so on is limited.

Further, the silica according to the present invention has a characteristic in that a $Q^4/Q^3$ value obtained by solid-state Si NMR measurement is usually 1.3 or more, preferably 1.5 or more. The $Q^4/Q^3$ value means a molar ratio of Si bonded to three (—OSi)S ($Q^3$) to Si bonded to four (—OSi)s ($Q^4$) in the above-described repeating unit of the silica. It has no particular upper limit, although being usually 10 or less. It is generally known that the silica has higher thermal stability as the $Q^4/Q^3$ value is larger. The silica according to the present invention is therefore expected to be highly excellent in thermal stability. On the contrast, the conventional crystalline micelle-templated silica mostly has a $Q^4/Q^3$ value smaller than 1.3, indicating its low thermal stability, especially hydrothermal stability.

It is possible to calculate both the chemical shift value δ of $Q^4$ peak and the $Q^4/Q^3$ value based on the results of solid-state Si NMR measurement using the method described latter, in EXAMPLES section. Analysis of measured data (determination of peak positions) is performed by deconvolution of a spectrum and extracting each peak using, for example, a Gaussian function.

In the meantime, the silica according to the present invention has a well-ordered structure with little distortion, and hence has high homogeneity in its microstructure. The homogeneity in microstructure of silica can be evaluated using the so-called Guinier plot of small-angle X-ray scattering (SAXS) spectrum. In the following, description will be made particularly on the relation between the homogeneity in microstructure of silica and the Guinier plot of small-angle X-ray scattering (SAXS) spectrum.

Pores of silica are formed while surrounded by spherical particles of silica colloid. Sizes of spherical particles forming silica vary according to the number of clusters. In the measurement of a small-angle X-ray scattering (SAXS) spectrum, scattering intensity according to a contrast between spherical particles and void (pore) in the network structure of the silica is observed: usually the scattering intensity is larger as the sizes of spherical particles are larger. In producing the silica having high homogeneity in its microstructure, aggregating and condensing process of the silica hydrogel is performed uniformly for the whole silica hydrogel, and the spherical particles of thus-formed silica hydrogel grow large with regularlity for the whole silica hydrogel without uneven growth.

Guinier formula is expressed by the following formula (II-1). In the formula (II-1), q mathematically means a value (Å$^{-1}$) designating Fourier-transformed space and being in proportion to a reciprocal of distance. Also q is a function of a scattering angle, expressed by the following formula (II-2).

$$I = I^0 \times \exp(-q^2 \times R_g^2/3) \qquad (II-1)$$

I: scattered intensity
$I^0$: scattered intensity when q=0
Rg: gyration radius of particles $$q = (4\pi/\lambda)\sin(2\theta/2) \qquad (II-2)$$

π: Ludolph's number
λ: X-ray wavelength (Cuα rays: 1.54 Å)
2θ: scattering angle

To sum up, Guinier plot shows relation between X-ray scattering intensity and $q^2$ value (Å$^{-2}$). It is therefore understood that the silica having no inflection point in a profile obtained by Guinier plot (X-ray scattering intensity–$q^2$ value) has regularity in growing of the spherical particles, and hence acquires high homogeneity in its microstructure. On the contrast, the silica having an inflection point in the profile, namely, having function (differential coefficient) of Guinier plot of the scattering spectrum changed lacks regularity in growing of the spherical particles, and hence lose homogeneity in its microstructure. Such information regarding small-angle X-ray scattering (SAXS) spectrum is especially important in a region of 300 Å or less (usually 100 Å or more) in size, namely, a region where $q^2$ value is $6 \times 10^{-3}$ (Å$^{-2}$) or less.

Preferably, in a profile obtained by a Guinier plot ((a scattering intensity of X-ray)–$q^2$ value) of a small-angle X-ray scattering (hereinafter called SAXS) spectrum of the silica according to the present invention, there is no inflection point in a region where $q^2$ value is $6 \times 10^{-3}$ ($\text{Å}^{-2}$) or less. It is thus considered that the silica according to the present invention has high homogeneity in its microstructure.

It is possible to measure the small-angle X-ray scattering (SAXS) spectrum using, for example, an RAD-B apparatus manufactured by Rigaku Industrial Co. with CuKα rays as a source.

Since large pores of silica are generally formed from gaps among large spherical particles, it is conceivable that there arises a higher regularity in change of the sizes of the spherical particles as the sizes of spherical particles grow larger to some extent. Thus the above-described condition regarding the profile obtained by Guinier plot in the present invention is especially significant for the silica whose mode pore diameter ($D_{max}$) is usually 20 nm or less and preferably 10 nm or less. Such silica is highly efficient and suitably used for a catalyst carrier and an adsorbent.

It is also possible to evaluate homogeneity in microstructure of silica based on relation between X-ray transmittance T (%) of silica and the mode pore diameter ($D_{max}$). The following description will be made particularly on this point.

When pores of silica grow with being surrounded by spherical particles of silica colloid as described above, there arises difference between aggregating states of clusters of silica colloid forming spherical particles. Such difference is caused according to production method of the silica, and the aggregating states of clusters are thus divided into high homogeneity state and low homogeneity state (condensed state). It is possible to evaluate such homogeneity in aggregating states of clusters based X-ray transmittance of silica. Since the homogeneity in aggregating states of clusters depends on the mode pore diameter ($D_{max}$), the evaluation must be made under the condition of a specific mode pore diameter ($D_{max}$).

Preferably, in the present invention, an X-ray transmittance T of the silica and the mode pore diameter ($D_{max}$) of the silica meet the following inequality (III).

$$4.98 \ln(D_{max}) - 7.50 < T \text{ and } T > 0 \quad \text{(III)}$$

Since the silica that meets the above inequality (III) has high homogeneity in aggregating states of clusters of silica colloid forming spherical particles, it is conceivable that the silica according to the present invention has high homogeneity in its microstructure. In the present invention, the X-ray transmittance T (%) of the silica is larger than the left side (4.98 $\ln(D_{max})$−7.50) of the above inequality (III) by usually 3% or more, preferably 5% or more. Maximum value of the X-ray transmittance T of silica is generally about 20%.

It is possible to measure the X-ray transmittance T using, for example, an RAD-B apparatus manufactured by Rigaku Industrial Co. with CuKα rays as a source. Specifically, a silica sample is grinded in a mortar for two minutes and is filled into a liquid cell having a cell thickness (light path) of 2 mm and a cell window made of PET resin film. After tapped until there occurs no volume decrease, transmitted light intensity is measured for 500 seconds of measuring time. The transmitted light intensity thus measured is standardized with transmitted light intensity of an empty cell and the standardized value is regarded as transmittance. Such measurement of transmittance is repeated three times at different positions for each sample, and the average of these three values is calculated and regarded as measured value.

Since the silica according to the present invention has high homogeneity in its microstructure as described above, it exhibits excellent properties such as high heat-resistance, high hydrothermal-resistance, and the like. It also has the characteristic that the quality of the products varies little between lots. The reason why it exhibits such characteristic is not always clear but is presumed as follows: such high homogeneity in its microstructure is caused by appropriate reaction rate of hydrolysis and condensation process (especially reaction rate of condensation). It is therefore presumed that when the hydrolysis and condensation process is carried out at appropriate reactionrate, silica of stable quality is formed without being affected by, for example, difference of stirring speed according to positions in a reactor vessel.

In addition to the above-described characteristics, the silica according to the present invention has larger pore volume and specific surface area than those of the conventional silica. Specifically, the value of pore volume is usually 0.6 ml/g or more, preferably 0.7 ml/g or more and usually 1.6 ml/g or less. And the value of specific surface area is usually 200 m$^2$/g or more, preferably 250 m$^2$/g or more, further preferably 300 m$^2$/g or more, still further preferably 500 m$^2$/g or more and usually 1000 m$^2$/g or less, preferably 950 m$^2$/g or less, further preferably 900 m$^2$/g or less. Both of the pore volume and specific surface area values can be measured by BET method based on adsorption and desorption of a nitrogen gas.

Further, in the silica according to the present invention, a percentage of a total volume of pores whose diameters are within the range of ($D_{max}$)±20% to a total volume of all pores is usually 50% or more, preferably 60% or more, further preferably 70% or more. This fact means that the silica according to the present invention has pores whose diameters are highly uniform about the mode pore diameter ($D_{max}$). The ratio has no particular upper limit, although it is usually 90% or less.

In connection with the above-described characteristic, the silica according to the present invention has a differential pore volume $\Delta V/\Delta(\log d)$ measured by the above BJH method at the mode pore diameter ($D_{max}$) within a range of usually 2 ml/g or more, preferably 3 ml/g or more, further preferably 5 ml/g or more and usually 20 ml/g or less, preferably 12 ml/g or less (in the afore-mentioned formula, d is a pore diameter (nm), and V is an absorption volume of a nitrogen gas). It is understood that the silica whose differential pore volume $\Delta V/\Delta(\log d)$ is within the above range has a very large absolute quantity of pores whose diameters are highly uniform about the mode pore diameter ($D_{max}$).

The silica according to the present invention is highly pure with extremely low total content of metal elements (metal impurities) belonging to one of alkali metal group, alkaline-earth metal group, 3A group, 4A group, 5A group, and transition metal group in the periodic table, which are known to affect properties of silica when contained in the silica. Specifically, a total content of such metal impurities is usually 500 ppm or less, preferably 100 ppm or less, further preferably 50 ppm or less, still further preferably 30 ppm or less. It is especially preferable that a total content of the elements belonging to either of alkali metal group and alkaline-earth metal group, which are known to bring about especially large effect on properties of silica, is usually 100 ppm or less, preferably 50 ppm or less, further preferably 30 ppm or less, still further preferably 10 ppm or less. Such a little effect of impurities has become a major contributing factor for the silica according to the present invention in exhibiting excellent properties such as high thermal resistance, high hydrothermal-resistance, and the like.

In the meantime, since the silica obtained by the conventional sol-gel method is generally contaminated with acidic ingredients of a catalyst, it has the potential for bringing about corrosion problem of apparatuses when used as a catalyst carrier or an adsorbent to be filled up in various apparatuses.

On the contrast, since the silica according to the present invention is produced by the method that, differently from the conventional sol-gel method, uses no catalyst (sulfuric acid, hydrochloric acid, nitric acid, etc.) as described below, it is highly pure with greatly diminished content of impurities elements (catalyst impurities) originating in the use of a catalyst. Specifically, a total content of S, Cl, and N is usually 10 ppm or less, preferably 5 ppm or less. Such catalyst as described above has a high affinity for silica so that it is hard to be fully removed by washing silica hydrogel or the like with water.

Incidentally, even in the conventional sol-gel method, the quantity of catalyst is determined regardless of the size of spherical particles of silica. It is therefore conceivable that as the sizes of spherical particles grow larger to some extent, the content of catalyst impurities becomes relatively smaller because larger spherical particles of silica can contain less impurities. Thus the above-described condition regarding the catalyst impurities is especially significant for the silica whose mode pore diameter ($D_{max}$) is usually 20 nm or more and preferably 10 nm or less. Such silica is highly efficient and suitably used for a catalyst carrier and an adsorbent.

The silica according to the present invention has the above-described structure and properties, which are also affected by microstructure of silica hydrogel being a precursor subjected to hydrothermal treatment. Although such microstructure of silica hydrogel is not directly observable, it is conceivable by drying the silica hydrogel to transform silica without performing hydrothermal treatment, and then measuring its wide-angle X-ray scattering (WAXS) spectrum pattern. The silica hydrogel having a particular microstructure is transformed through hydrothermal treatment followed with drying into the silica having high homogeneity in its microstructure.

Specifically, it is preferable that the silica hydrogel used as raw material of the silica according to the present invention is, when dried without undergoing hydrothermal treatment, transformed into a silica having a wide-angle X-ray scattering (WAXS) spectrum which includes a pair of peaks at a region of $0.7 \leq q$ value $\leq 1.3$ and at a region of $1.3 < q$ value $\leq 2.0$, respectively.

The above q value mathematically means a value ($Å^{-1}$) designating Fourier-transformed space and being in proportion to a reciprocal of distance. Also q is a function of a scattering angle, expressed by the following formula (IV-1).

$$q = (4\pi/\lambda)\sin(2\theta/2) \quad \text{(IV-1)}$$

π: Ludolph's number
λ: X-ray wavelength (Cuα rays: 1.54 Å)
2θ: scattering angle

On analyzing WAXS spectrum pattern, the above q is related with a correlation length R (Å), as expressed by the following formula (IV-2).

$$R(Å) = 2\pi/q \quad \text{(IV-2)}$$

The above correlation length R (Å) is equal to a distance in periodic structure of silica particles (a distance appearing with regularity). Of a pair of q values defined in the present invention, one q value ($0.7 \leq q$ value $\leq 1.3$) is between 9.0 and 4.8 Å and the other q value ($1.3 < q$ value $\leq 2.0$) is between 4.8 and 3.1 Å in terms of correlation length R (Å).

Silica hydrogel before undergoing hydrothermal treatment has high liquid content of, for example, 70 wt % and is hard to be subjected to WAXS spectrum pattern measurement in just the state as it is because of its excessively high contrast to a solvent. In the present invention, to obtain WAXS spectrum pattern, silica hydrogel obtained is immediately dryed without being undergone hydrothermal treatment, and the resultant silica is subjected to WAXS spectrum pattern measurement. The drying is carried out by spreading out 5 g of silica hydrogel in a vacuum desiccator (so as to form a thin layer of 5 mm thickness) and then vacuum drying at 60° C. for 5 hours.

As the present inventors analyzed, the WAXS spectrum pattern of the silica obtained by drying without performing hydrothermal treatment varies according to a difference of production method used for the silica hydrogel. For example, when water glass is used as raw material, a peak is observed only within the q-value region $1.3 < q$ value $\leq 2.0$ (a distance of periodic structure is between 4.8 and 3.1 Å): this is called the first peak in the following. In the present invention, in addition to the first peak, another peak is observed within q-value region $0.7 \leq q$ value $\leq 1.3$ (between 9.0 and 4.8 Å): this is called the second peak in the following.

The significance of the above peaks based on a WAXS spectrum pattern is not always clear but is presumed as follows: silica hydrogel is produced by condensation process of silica hydrosol, which is formed through hydrolysis of raw material (water glass or silicon alkoxide), and hence has diversity in aggregating particles in different level of condensation. The above condensation process has several characteristic stages, for example: stage A, at which a silica ingredient begins condensing to form circular structure; stage B, at which the formed circular structure encloses particular ingredients (for example, when silicon alkoxide is raw material, by-products of the hydrolysis such as alcohols); stage C, at which the above circular structure grows further, etc. It is presumed that, for example, in the silica hydrogel with the first peak only, particles at stage A has periodic structure (regularlity) while particules reaches the subsequent stages have no periodic structure, namely, failed to maintain periodic structure continuously. On the contrast, it is presumed that in the silica hydrogel with both the first and second peaks, periodic structure of particles is maintained through the proceeding of condensation process. Put another way plural particles at different growth stages (in different sizes) maintains periodic structure and has high homogeneity in their microstructure. Since silica hydrogel having high homogeneity in its microstructure is used as raw material as described above, the silica according to the present invention, which is transformed from the silica hydrogel, is expected to exhibit excellent properties such as high heat-resistance and hydrothermal-resistance.

It is possible to measure the wide-angle X-ray scattering (WAXS) spectrum pattern of silica in the same manner as a source X-ray scattering spectrum pattern of silica, namely, using an RAD-B apparatus manufactured by Rigaku Industrial Co. with CuKα rays as a source.

(2) Production Method of Silica According to Present Invention

The silica according to the present invention is produced by a method, differently from the conventional sol-gel method, comprising the steps of hydrolyzing a silicon alkoxide to obtain a silica hydrosol while condensing the silica hydrosol to thereby form a silica hydrogel, and carrying out a hydrothermal-treatment of the silica hydrogel subsequently to said hydrolyzing/condensing step without aging the silica hydrogel.

For example of silicon alkoxide used as raw material of the silica according to the present invention, tri or tetraalkoxysilane with a lower alkyl group whose carbon number are between 1 and 4, such as trimethoxysilane, tetramethoxysilane, triethoxysilane, tetraethoxysilane, tetrapropoxysilane, tetrabutoxysilane, and their oligomers are mentioned. Above all, tetramethoxysilane, tetraethoxysilane and their oligomers are preferred. The above-mentioned examples of silicon alkoxide can be easily purified by distillation and is therefore suitable for raw material of silica in high purity. A total content of metal elements belonging to alkali metal group or alkaline-earth metal group (metal impurities) in silicon alkoxide is usually 100 ppm or less, preferably 50 ppm or less, further preferably 30 ppm or less, still further preferably 10 ppm or less. Content of these metal impurities is measurable using a method same as that used for a content of impurities in general silica.

In the present invention, as the hydrolyzing and condensing step, silicon alkoxide is hydrolyzed in the absence of any catalyst while silica hydrosol obtained is condensed to thereby form silica hydrogel.

Hydrolysis of silicon alkoxide is carried out using water of, per 1 mol of silicon alkoxide, usually 2 mol or more, preferably 3 mol or more, further preferably 4 mol or more and usually 20 mol or less, preferably 10 mol or less, further preferably 8 mol or less. Hydrolysis of silicon alkoxide generates silica hydrogel and alcohols, and the generated silica hydrosol is successively condensed to form silica hydrogel.

In order to produce silica having no inflection point in a profile obtained by Guinier plot (silica with high homogeneity in its microstructure) as described above, it is important that quantity of water used for the hydrolysis satisfies the above-defined range. If the quantity of water exceeds the above-defined range, the spherical particles forming silica lose regularity in their growing. The reason of the loss of regularity is not always clear but is presumed as follows: If a great amount of water is used, silica hydrosol cannot be gelated with maintaining a uniformly dispersed state. The gelation of silica hydrosol proceed in such a manner that primary particles are aggregated to form spherical particles, and then these spherical particles are gathered together, and so forth. It is presumed that because such a change of state is repeated, spherical particles are difficult to grow large with uniformity throughout the whole silica hydrogel. On the contrary, if the quantity of water is less than the above-defined range, because the hydrolysis does not proceed completely, spherical particles are difficult to grow large with uniformity throughout the whole silica hydrogel likewise.

Hydrolysis is carried out at a temperature of usually room temperature or more, preferably 30° C. or more, further preferably 40° C. or more, still further preferably 50° C. or more, and usually 100° C. or less, preferably 90° C. or less, further preferably 80° C. or less, still further preferably 70° C. or less. The hydrolysis reaction can be carried out at higher temperature by maintaining liquid phase under high pressure.

At this stage, in order to obtain the silica hydrogel which, when dried without undergoing hydrothermal treatment, is transformed into a silica whose wide-angle X-ray scattering (WAXS) spectrum includes the above-described first and second peaks (silica hydrogel suitable for raw material of the silica according to the present invention), in addition to the quantity of water used for the hydrolysis, it is also important that temperature at which the hydrolysis is carried out satisfies the above-defined range. If the temperature does not meet the above-defined range, silica hydrogel is hard to maintain the above-mentioned periodic structure during its growth, and the first and second peaks scarcely appear.

It is also preferable that, as the need arises, the hydrolysis is carried out in the presence of a solvent having compatibility with water such as alcohols. Specifically, lower alcohols whose carbon number are between 1 and 3, dimethylformamide, dimethylsulfoxide, acetone, tetrahydrofuran, ethylene glycol monomethyl ether, ethylene glycol monoethyl ether, methylethylketone, and other organic solvents mixable with water. Above all, a solvent that does not show strong acidity or basicity is highly preferable for generating uniform silica hydrogel.

If such solvent is not used, in order to produce the silica according to the present invention, stirring speed during hydrolysis is especially important. Since silicon alkoxide and water for hydrolysis separates at early stage, it is necessary to emulsify them by stirring so as to accelerate the reaction.

It is important to carry out stirring sufficiently. For example, if a stirrer with stirring blades attached around a rotation axis is used, the stirring speed (the number of rotations of the rotation axis) depends on the size of reactor, the size of stirring blades, the shape of stirring blades, the number of stirring blades, contact area to the reaction solution, although it is usually 30 rpm or more, preferably 50 rpm or more.

If, however, the stirring speed is too fast, there is the possibility that droplets originate from inside a vessel block off various gass lines or adhere to an inner wall of the reactor vessel to thereby worsen heat conduction and have a bad influence on temperature management, which is important in controlling physical properties. Further, the extraneous matters adhered to the inner wall may come off and get mixed into products to thereby make worse the quality. On such grounds, it is preferred that the stirring speed is usually 2000 rpm or less, particularly 1000 rpm or less.

As a method for stirring two separating liquid phases (water phase and silicon alkoxide phase) in the present invention, any stirring method is applicable as much as it can accelerate the reaction. Above all, as preferable apparatus that can fully mix these two liquid phases, the following (i) and (ii) are mentioned.

(i) a stirrer having the stirring blades whose rotation axis is inserted vertically or slightly obliquely into the liquid surface so as to generate up-and-down flow in the reactor.

(ii) a stirrer having the stirring blades whose rotation axis is in the direction substantially parallel to the surface of the mixture so as to generate agitation across the two liquid phases.

Preferably, when a stirrer as above-described (i) or (ii) is used, the rotational speed of the stirring blades is such a speed that a circumferential speed of the stirring blades (a speed of the edges of stirring blades) is between 0.05 and 10 m/s, particularly 0.1 and 5 m/s, further particularly 0.1 and 3 m/s.

The shape or the length of the stirring blade can be selected appropriately without restraint. For example of the stirring blade, a propeller blade, a plain blade, an inclined blade, a pitch plain blade, a plain disc turbine blade, a curved blade, a phaudler-type blade, an anchor blade, and a ribbon blade are mentioned.

The width of the blades, the number of the blades, the angle of inclination of the blades, etc. can be selected appropriately according to the shape and size of a vessel of a reactor and a stirring power to be used. For example of a preferable stirrer, a ratio (b/D) of the width of the blade (the width of the blade along the direction of the rotation axis) to the internal diameter of a vessel of a reactor (the maximum section of the surface of liquid phase which defines a vertical plane with respect to the direction of the rotation axis) is between 0.05 and 0.2, angle of inclination (θ) is within a range of 90°±10°, the number of the blades is between 3 and 10.

Especially, an apparatus having a structure such that the rotation axis is disposed over the surface of a liquidin a reactor vissel, and that the stirring blades is attached to the tip of a shaft extended from the rotation axis, is preferably used from the points of view of stirring efficiency and maintenance of the apparatus.

If the above-described conditions are not satisfied, it is difficult to obtain the silica according to the present invention.

When alcohols are generated by hydrolysis and the reaction solution becomes homogeneous, after generation of heat has subsided, it is preferred to stop stirring so that uniform hydrogel is formed.

Silica that shows crystallinity tends to have low hydrothermal stability. If silicon alkoxide is hydrolyzed under the condition that there exists a template such as surfactant, which is generally used for forming pores in silica, the resultant silica is apt to have crystalline structure. It is therefore preferred in the present invention that the hydrolysis is carried out in the absence of any template such as surfactant or the like; namely, under the condition that the surfactant or the like does not exist in such a quantity that it functions as a template.

Reaction time of hydrolysis is difficult to prescribe indiscriminately because the time required for completion of gelation varies according to composition of the reaction solution (a kind of silicon alkoxide or a molar ratio to water) and hydrolysis temperature. It is possible to accelrate hydrolysis by adding acids, alkalis, salts, etc. to the system of reaction as catalysts. Use of such additives, however, brings about aging of the hydrogel formed as described later, and is therefore not so preferable in producing the silica according to the present invention.

In order to produce the silica whose X-ray transmittance T and mode pore diameter ($D_{max}$) is larger than the left side (4.98 ln($D_{max}$)−7.50) of the above inequality (III) by preferably 3% or more (silica having high homogeneity in its microstructure), it is especially preferred to adopt a fast raising rate of temperature during hydrothermal treatment so that temperature in the system of reaction reaches target temperature within 5 hours. Specifically, if the reaction solution is charged in a vessel to be processed, it is preferred that a mean raising rate of temperature from the start of temperature rising until the attainment of the target temperature is usually between 0.1 and 100° C./min, particularly between 0.1 and 30° C./min, more particularly between 0.2 and 10° C./min. It is also preferable to adopt a temperature-raising method using a heat exchanger and the like, or a method using hot water prepared behorehand because it is possible to shorten the time required for temperature rising. Temperature-raising can be also carried out stepwise as long as the mean raising rate of temperature satisfys the above range. If it takes long time until the temperature in the system of reaction reaches the target temperature, aging of silica hydrogel progresses during rising of temperature, so that the hydrogel may lose high homogeneity in its microstructure. Time of raising temperature until it reaches the target temperature is preferably within 4 hours, more preferably within 3 hours.

In the hydrolysis reaction of silicon alkoxide, the silicon alkoxide is hydrolyzed to form silicate at first, then the silicate successively undergos condensation reaction while viscosity of the reaction solution increases, and at last the reaction solution is gelated to form silica hydrogel.

Next, in the present invention, as a property-controlling step, the silica hydrogel generated from the hydrolysis is successively subjected to a hydrothermal treatment subsequently to the hydrolyzing/condensing step without substantially aging so that the silica hydrogel the hydrolysis does not increase its hardness. By hydrolyzing silicon alkoxide, soft silica hydrogel is generated. The conventional method first subjects this hydrogel to aging or drying, and thereafter carries out hydrothermal treatment. Using such a method, it is difficult to produce the silica gel with highly controlled properties as prescribed in the present invention.

The above-described fact that silica hydrogel generated from the hydrolysis is successively subjected to hydrothermal treatment without substantially aging means that the silica hydrogel is subjected to the subsequent hydrothermal treatment while maintaining a soft state as it has immediately after the generation of silica hydrogel.

Specifically, it is preferable to carry out hydrothermal treatment of silica hydrogel usually within 10 hours, perticularly within 8 hours, more perticularly within 6 hours, still more perticularly within 4 hours, from a point of time the silica hydrogel generates.

In industrial plant, for example, there is a case where a large quantity of silica hydrogel is generated and stored in a silo or the like for a while, and then hydrothermal treatment is carried out on the silica hydrogel. In such a case, a passing time from the silica hydrogel generates until it is subjected to hydrothermal treatment may exceeds the above-defined range. In order to prevent substantial aging of silica hydrogel, it is sufficient to, for example, keep liquid components in the silica hydrogel from drying during the storage of silica hydrogel in a silo.

Specifically, it is preferred to shut up the silo or adjust the humidity in the silo. Also preferred is to immerse the silica hydrogel in water or other solvent during the still storage.

During the strage of silica hydrogel, it is also preferred to keep temperature low, for example, usually 50° C. or less, particularly 35° C. or less, further particularly 30° C. or less. Another technique for preventing substantial aging of silica hydrogel is to prepare silica hydrogel with controlling composition of ingredients in advance so that the concentration of silica in silica hydrogel becomes relatively low.

The advantageous effect caused by the immediate hydrothermal treatment of silica hydrogel without substantial aging, and the reason for the effect, are considered as following.

If silica hydrogel is aged, a macrostructural network structure composed of —Si—O—Si— bonds is formed throughout the whole silica hydrogel. It is presumed that the network structure spreading throughout the whole silica hydrogel becomes an obstacle to formation of pores during hydrothermal treatment. On the contrast, if silica hydrogel is prepared with controlled composition of ingredients in advance so that the concentration of silica in silica hydrogel becomes relatively low, it is presumed that the formation of cross-linking is inhibited during the storage of silica hydrogel and thus silica hydrogel is kept from aging.

It is therefore important in the present invention to subject silica hydrogel to the immediate hydrothermal treatment of without substantial aging.

It is undesirable to add acids, alkalis, salts, etc. to the system of hydrolysis reaction of silicon alkoxide, or to set the temperature for the hydrolysis reaction excessively severe, because such treatments would accelrate aging of hydrogel.

As a method to concretely check aging state of hydrogel, hardness of hydrogel measured using a method described later in Embodiment section is mentioned. Specifically, by carrying out hydrothermal treatment using the soft hydrogel whose fracture stress is usually 6 MPa or less, preferably 3 MPa or less, more preferably 2 MPa or less, it is possible to obtain silica whose properties meet the conditions defined in the present invention.

Various conditions for the hydrothermal treatment will be described in the following: water may be either liquid or gas, or may be diluted with any solvent or other gas, although it is preferable to use liquid water to mix with silica hydrogel into the form of slurry. A quantity of water to be used is, against silica hydrogel, usually 0.1 time or more by weight, preferably 0.5 time or more by weight, further preferably 1 time or more by weight, and usually 10 times or less by weight, preferably 5 times or less by weight, further preferably 3 times or less by weight. Temperature for hydrothermal treatment is usually 40° C. or more, preferably 50° C. or more, and usually 250° C. or less, preferably 200° C. or less. Duration time of hydrothermal treatment is usually 0.1 hour or more, preferably 1 hour or more, and usually 100 hours or less, preferably 10 hours or less.

It is allowable that water used for hydrothermal treatment includes lower alcohols, methanol, ethanol, propanol, dimethylformamide (DMF), dimethylsulfoxide (DMSO), or other organic solvents. The method of hydrothermal treatment is also applicable to materials where, for the purpose of produce membrane reactor or the like, silica is formed as films or layers on particles, a basal plate, or base substance such as a tube. It is possible that a reactor vessel used for the hydrolysis reaction is successively used for the hydrothermal treatment with changing temperature. However, since the optimum condition for the hydrolysis reaction is generally-different from that for the hydrothermal treatment, it is usually difficult to obtain the silica according to the present invention according to the method using the same reactor vessel successively.

Among the conditions for hydrothermal treatment descrived above, the pore diameter and pore volume of the resultant silica tends to become larger as temperature becomes higher. Preferably, temperature for hydrothermal treatment is usually between 100 and 300° C., preferably between 100 and 250° C., more preferably between 100 and 200° C. Besides, as time passes in hydrothermal treatment, the specific surface area of the resultant silica tends to once reach a maximum and then decrease slowly. The conditions for hydrothermal treatment should be determined based on the above-described tendency in accordance with desired properties, although it is generally preferable to set higher temperature for hydrothermal treatment than that for the hydrolysis reaction since hydrothermal treatment is carried out for the purpose of modifying properties of silica.

If temperature or duration time for hydrothermal treatment is outside the above-described range, it is difficult to obtain silica according to the present invention. For example, temperature for hydrothermal treatment is too high, the pore diameter and pore volume of silica becomes too large and the pore distribution of silica becomes too broad. On the contrast, temperature for hydrothermal treatment is too low, the resultant silica includes little cross-linkages and is hence low in thermal stability, causing lack of peak in pore distribution or extremely small $Q^4/Q^3$ value in the solid-state Si NMR.

Hydrothermal treatment in ammonia water brings about the same effect at lower temperature compared with hydrothermal treatment in pure water. Besides, the resultant silica obtained by hydrothermal treatment in ammonia water generally exhibits higher hydrophobicity compared with that obtained by pure water treatment. Extremely high hydrophobicity is obtained by carrying out hydrothermal treatment at relatively high temperature of usually 30° C. or more, preferably 40° C. or more, and usually 250° C. or less, preferably 200° C. or less. The concentration of ammonia in ammonia water is preferably 0.001% or more, further preferably 0.005% or more, and preferably 10% or less, further preferably 5% or less.

Subsequently to hydrothermal treatment, silica hydrogel is dried at temperature of usually 40° C. or more, preferably 60° C. or more, and usually 200° C. or less, preferably 120° C. or less. A drying method is not particularly limited: it may be either batch processing or continuous processing, or may be executed either under normal pressure or under reduced pressure. If the resultant silica contains carbon content originating from silicon alkoxide being raw material, it is preferable to calcine at temperature of usually 400 and 600° C. to eliminate the carbon content. It is also preferable to calcine at maximum temperature of 900° C. in order to control condition of the silica surface. Finally, after crushed and classified if necessary, the silica according to the present invention is obtained as the final product.

(3) Application of Silica According to Present Invention:

The silica according to the present invention can be utilized in any applications in addition to the conventional applications of silica. Among these, the conventional applications include the following uses.

For example in an application field used in production and treatment of products in industrial equipments, may be mentioned applications to various kinds of catalysts and catalyst carriers (acid and base catalysts, photocatalysts, noble metal catalysts, etc.), waste water or slop oil treatment agents, deodorizers, gas separators, industrial desiccants, bioreactors, bioseparators, membrane reactors, and the like. In an application field of building materials, may be mentioned applications to moisture conditioning agents sound insulating or absorbing materials refractory heat insulating materials, and the like. In an application field of air conditioning may be mentioned applications to moisture conditioning agents for desiccant air-conditioners, thermal accumulators for heat pumps, and the like. In an application field of paint and ink, may be mentioned applications to delustering agents, viscosity adjusters, chromaticity adjusters, precipitation preventing agents, antifoaming agents, ink strike-through preventing agents, stamping wheels, wall paper, and the like. In an application field of additives for resins, may be mentioned applications to anti-blocking agents for films (polyolefin, polyester, etc.), plate-out preventing agents, reinforcing agents for silicone resins, reinforcing agents for rubber (for tires, general rubber, flowability etc.), improvers, anti-caking agents for powdery resins, ink suitability modifiers, delustering agents for artificial leathers and coating films, fillers for additives and adhesive tapes, light transmission property adjusters, glare protection adjusters, fillers for porous polymer sheets, and the like. In an application field of paper making, may be mentioned applications to fillers (foreign matter attachment preventing agents, etc.) for heat sensitive paper, fillers (ink absorbents, etc.) for improving images on ink-jet paper, fillers (photosensitive density improvers, etc.) for diazo sensitized paper, writability improvers for tracing paper, fillers (writability, ink absorptivity and anti-blocking property improvers, etc.)

for coated paper, fillers for electrostatic recording, and the like. In an application field of food, may be mentioned applications to filter aids for beer, for sedimentation agent, for fermentation products such as soy, rice wine and wine stabilizers (scavengers of turbidity factor proteins and yeast, etc.) for various fermentation drinks, food additives, anti-caking agents for powdery food, and the like. In an application field of medical and agricultural chemicals, may be mentioned applications to tabletting aids for chemicals, grinding aids, carriers (dispersibility, gradual releasability and delivery property improvers, etc.) for drugs, carriers (carriers for oily agricultural chemicals, hydration dispersibility, gradual releasability and (delivery property improvers, etc.) for agricultural chemicals, additives (anti-caking agents, powdering ability improvers, etc) for drugs, additives (anti-caking agents, precipitation preventing agents, etc.) for agricultural chemicals, and the like. In an application field of separation-materials, may be mentioned applications to fillers for chromatography, separating agents, fullerene separating agents, adsorbents (for proteins, coloring matter, odor, etc.), dehumidifiers, and the like. In an application field of agriculture, may be mentioned applications to additives for feeds and additives for fertilizers. As other applications, may be mentioned moisture conditioning agents, desiccants, cosmetic additives, antibacterial agents, deodorants, deodorizers, fragrants, additives (powdering ability improvers, anti-caking agents, etc.) for detergents, abrasives (for dentifrice, etc.), (powdering ability improvers, anti-caking agents, etc.) for powder fire extinguishers, anti-foaming agents, buttery separators, and the like in a life related application field.

In particular, the silica according to the present invention has great pore volume and specific surface area compared with the conventional silica having the same pore diameter, and so it has high adsorption and absorption capacities and its pores can be controlled precisely. Accordingly, it can be suitably used in fields of which particularly excellent heat resistance and water resistance are required, and moreover controlled pore properties, and the fact that physical properties scarcely change over a long period of time are required among the above-mentioned applications.

The silica according to the present invention is also suitably used in fields of which a particle diameter of at most 50 μm is required, and precisely controlled pore properties and stable physical properties are required. In general, when the mean particle diameter of silica is controlled to 50 μm or smaller, the external surface area per unit weight increases, and various substances can be adsorbed and/or absorbed in grain boundaries, so that the adsorbing and absorbing performance is more enhanced. More specifically, the particle diameter of the silica according to the present invention is made small whereby the silica can be provided as silica which develops various features that the silica according to the present invention already has, such as high pore volume, high specific surface area, sharp pore distribution, high purity and little physical property changes, and further has excellent adsorptivity and absorptivity.

When the silica according to the present invention is used in such a field, the mean particle diameter may be controlled to a value required of the field. However, it is used by controlling the mean particle diameter to generally 50 μm or smaller preferably 30 μm or smaller, particularly preferably 5 μm or smaller. No particular limitation is imposed on the lower limit of the mean particle diameter. However, it is preferably 0.1 μm or greater. Applications of the silica having such a small particle diameter include various kinds of adsorbents, fillers for resins, ink absorbents for ink-jet paper, anti-blocking agents for films, filter aids for drinks and various kinds of catalyst carriers. The silica according to the present invention having a mean particle diameter of, for example, 5 μm or smaller is useful as an absorbent for ink-jet paper because the ink absorption velocity is high, and the oil absorption performance is high.

On the other hand, the mean particle diameter of the silica according to the present invention may also be preferably made great. The mean particle diameter is made great, whereby the silica according to the present invention combines the features such as high pore volume, high specific surface area, sharp pore distribution, high purity and little physical property changes with features characteristic of great particles. Such silica is extremely useful in fields of which both features are required. For example, the silica having a great mean particle diameter may be used as an optical glass body because scattering of light becomes little. On the other hands, they are also useful for fixed-bed reactor or adsorbent because of low pressure-loss, ease of product separation, and so on.

Specifically, the silica according to the present invention is also suitably used in fields of which a particle diameter of at least 500 μm is required and precisely controlled pore properties and stable physical properties are required. When the silica according to the present invention is used in such a field, the mean particle diameter may be controlled to a value required of the field. However, it is used by controlling the mean particle diameter to generally 500 μm or greater, preferably 5 mm or greater. No particular limitation is imposed on the upper limit of the mean particle diameter. However, it is preferably 5 cm or smaller. The silica according to the present invention having a mean particle diameter of, for example, 500 μm or greater has controlled pores and thus carries optically useful pigments, metals, photocatalysts, photochromic compounds and other optically functional materials at fixed sizes according to pore diameters utilizing these pores. Such silica is hence useful as a functional optical material. It is generally difficult to produce particles having a great mean particle diameter without causing crude cracks. However, the silica according to the present invention has a uniform structure, scarcely causes crude cracks even by a treatment followed by volume change, such as a hydrothermal treatment, has controlled pore properties and can be provided as a product having a relatively great mean particle diameter.

When silica is used for various purposes as mentioned above, it is common to control various factors such as particle diameter, particle shape, hardness, aggregating state, and particle size distribution, in order to give additional characteristic to silica according to its purpose. Particularly, the silica in the form of aggregates of fine particles (hereinafter called fine-silica-particle aggregate) and the silica in the form of spherical or substantially spherical particles (hereinafter called spherical silica particles) are especially useful each for particular purposes. Description will hereinafter be made on the cases where the silica according to the present invention is made in the forms of fine-silica-particle aggregates and spherical silica particles.

(3-i) Fine-Silica-Particle Aggregates

Silica in the form of aggregates of fine particles, especially in the form of aggregates of fine particles with a little strength, are generally used suitably for particular purposes, for example, the purpose where it is demanded that silica keeps definite forms before actual use, specifically, during preparation or during transport while it breaks into the form of separate fine particles during actual use.

For example, when silica is used for a carrier of a catalyst for olefin polymerization, it is known that polymerization occurs on the surface of a catalyst carried by silica particles and the resultant polyolefin grows with breaking the silica particles. It is therefore preferred to use silica particles with a little strength as a carrier of the olefin polymerization catalyst. In addition, for the purpose of an anti-blocking agent of film or a deglosser of paint, silica in the form of fine powder silica gel is generally used. It is therefore demanded for the silica to generate little fine dust during preparation, have high bulk specific gravity, and be superior in easiness of blending, so that the silica is often provided in the form of fine-particle aggregates. Further, when silica is used for a carrier of additives to food, oral medicine, detergent, etc., it is preferred to make silica into such a form that it keeps a granular shape before actual use so as to be easily handled without generation of floating dust, while it decomposes quickly into file particles so as to disperse into water upon actual use.

Additionally, in handling silica-particle-related products, it is often demanded to make silica into the form of fine-particle aggregates from the viewpoints of automating and improving the precision of operations such as supply and packaging, of conversing from weight-based material accounting into number-based material accounting, and of improving packing materials.

The above-mentioned purposes are merely a part of examples of various purposes for which fine-silica-particle aggregates are used. Recently, for the individual purposes, fine-silica-particle aggregates having sharper pore distribution and keeping various properties, such as pore properties, stable after aggregating process have been desired.

Incidentally, the term "fine-silica-particle aggregates" means aggregates each being composed of primary silica particles, whose particle diameter is 0.1 between 10 μm, and having particle diameter five times or more as large as that of primary silica particles.

Examples of production methods for such fine particle aggregates of silica may be mentioned as following:

(a) silica obtained using a known technique is crushed to fine particles and the fine particles are aggregated by, if necessary, adding inorganic or organic binder component.

(b) reaction conditions for silica synthesis are manipulated to thereby directly obtain silica in the form of aggregates of fine particles.

The above method (a), which is most frequently used for obtaining powdery aggregates, includes the steps of crushing silica material (crude silica) finely, which has been obtained using a known technique, into fine powder with a diameter of 10 μm or less (primary particles) according to a wet or dry grinding method, and then processing the fine powder into the form of aggregates according to a known granulation method. Examples of porous silica material obtained by a known method are: silica which is obtained using water glass as raw material, as described above, and undergone hydrothermal treatment so as to control porous properties; silica obtained using silicon alkoxide as raw material and also undergone hydrothermal treatment so as to control porous properties; and silica obtained from water glass or silicon alkoxide as silica source, by forming pores using a organic template such as surfactant and then selectively removing the template by washing or calcination (micelle template silica). All of the above examples can be suitably used for transforming into the form of aggregates by the above method (a). However, since fine-silica-particle aggregates basically take over properties of the crude silica before aggregating, it is difficult to obtain fine-silica-particle aggregates having sharp pore distribution and being superior in stability of properties. Besides, properties of crude silica are apt to degenerate during the crushing and aggregating steps, it is difficult to obtain fine-silica-particle aggregates that maintains pore properties of the original crude silica sufficiently.

On the other hand, as a example of the method (b) may be mentioned a method of producing precipitated silica: when water glass is neutralized with sulfuric acid to silica hydrogel, gelation is carried out under alkali condition of pH 7 to 10. Silica obtained according to this method generally has a high specific surface area and a small pore volume, although its pore distribution does not have any sharp peak. Besides, it is difficult to precisely control aggregating state, causing difficulty in controlling particle diameter or crushing strength of aggregates.

Although the conventional silica fine-particle aggregates has such problems as described above, by using the silica according to the present invention, it is possible to obtain fine particle aggregates which have small crushing strength, a high specific surface area, a large pore volume, and sharp pore distribution and are superior in stability of properties and also in productivity with low cost of production, namely, possesses various kinds of desirable characteristics with sufficient balance.

When the silica according to the present invention is made in the form of fine-particle aggregates, it is recommended to set the crushing strength at a small value of usually 100 N/granule or less. The term "crushing strength" means a measure of strength of fine-particle aggregates. It is known that in a purpose where large strength is required for fine-particle aggregates, the crushing strength value must be set at 15 kgf (about 147 N) or more. Taking it into consideration, it is understood that the prescribed value (100 N or less) in the present invention is relatively small. If the crushing strength value is less than 5 N, since granules of aggregates become to be easily broken during preparation, it is difficult to use as shaped products. If crushing strength is a very small value of about 1 N, aggregates barely maintain their granular shapes. However, these values are merely standards, and an appropriate crushing strength value for fine-particle aggregates varies according to their purpose.

In order to produce fine-particle aggregates using the silica according to the present invention as crude silica, it is sufficient to crush finely the silica of the present invention, which obtained by the above production method, into primary particles and then to aggregate and glanule the primary particles. Primary particle diameter is, although variable according to the purpose of the fine-particle aggregates, usually 0.1 μm or more, preferably 10 μm or less, while particle diameter of fine-particle aggregates is 5 times or more as large as that of the primary particles.

On crushing crude silica finely, any known devices or instruments are usable without restrictions. Specifically, in order to obtain fine powdery silica particles of 10 μm or less diameter, it is preferable to use the following devices and instruments: a ball mill (a rolling mill, an oscillation ball mill, a planetary mill, etc.); a stirring mill (a tower grinder, a stirring vessel type mill, a floating tubular mill, an annular mill, etc.); a high-speed rotary grinder (a screen mill, a turbo mill, a centrifugal classification mill, etc.); a jet grinder (a circulating jet mill, a collision mill, a fluidized-bed jet mill, etc.); a sheering mill (a pulverizer, an Ong mill, etc.); a colloid mill; a mortar; and others. Among the above examples, in order to obtain super fine particles with diameter of 2 μm or less, it is more preferable to use a ball mill or a stirring mill.

According to the state of crude silica, crushing methods are classified into a wet method and a dry method. Either of them is selectable, although a wet method is preferable in order to obtain super fine particles. As a dispersion medium usable in a wet method, both water and various organic solvents such as alcohols, in addition to a mixed solvent of two or more solvents, are usable and may be selected according to its purpose. If necessary, drying may be carried out in a wet method before the granulation step. It is undesirable to continue applying strong pressure or shearing force unnecessarily for a long time during crushing because pore properties of the crude silica may deteriorate.

Next, primary particles of silica, which have been obtained by the above crushing process, are granulated according to a known method into the form of aggregates (for example, spherical aggregates). If a particle diameter of primary particles is 2 μm or less, it is possible to obtain aggregates without adding any binder or the like, only by adding water to make water slurry and then drying. On the other hand, if a particle diameter of primary particles exceed 2 μm, a binder is usually necessary in order to obtain stable aggregates. As a substance used for the binder, which is not particularly limited, the following examples can be given: as substances to be dissolved into water, sugar, dextrose, corn syrup, gelatin, carboxymethylcellulose (CMC), poly(vinyl alcohol) (PVA), and other water-soluble macromolecules, water glass, silicon alkoxide hydrolysis solution (which is also usable for solvent system), etc.; as substances to be dissolved into other solvents, various waxes, lacquers, oil soluble macromolecules, etc. In order to transform the silica of the present invention into aggregates with small crushing strength with maintaining its porous properties, it is preferable to use no binder or, if inevitably, to use a binder of high purity having a low content of metal impurities, which may induce degeneration of properties of crude silica gel, in minimum amount.

As a method for granulating fine-particle aggregates, any known method is available. Typical examples are the following: rolling method, fluidized-bed method, stirring method, grinding method, compressing method, extruding method, spraying method, and others. Specifically, in order to obtain fine particles aggregates with small crushing strength and well-controlled pore properties, it is important to carefully select the kind, and amount of the binder according to its purity or the like, and also not to apply unwanted pressure during granulation of fine silica particles.

Further, if necessary, by crushing and classifying the granulated fine-particle aggregates, fine-particle aggregates of the silica according to the present invention are obtained as final products.

Fine-particle aggregates of the silica according to the present invention are suitably used, for example, for the purpose where it is demanded that silica keeps definite forms before actual use, specifically, during preparation or during transport while it breaks into the form of separate fine particles during actual use.

Specifically, when silica is used for a carrier of a catalyst for olefin polymerization, it is known that polymerization occurs on the surface of a catalyst carried by silica particles and the resultant polyolefin grows with breaking the silica particles. It is hence preferred to use silica particles with a little strength as a carrier of the olefin polymerization catalyst. In addition, for the purpose of an anti-blocking agent for film or a deglosser for paint, silica in the form of fine powder silica is generally used. It is therefore demanded for silica to generate little fine dust during preparation, have high bulk specific gravity, and be superior in easiness of blending, so that silica is often provided in the form of fine-particle aggregates. Further, when silica is used for a carrier of additives to food, oral medicine, detergent, etc., it is preferred to make silica into such a form that it keeps a granular shape before actual use so as to be easily handled without generation of floating dust, while it decomposes quickly into file particles so as to disperse into water に into water upon actual use. Fine-particle aggregates of the silica of the present invention are therefore suitably used especially for these purposes.

Incidentally, a shape of fine particles aggregates is selectable without restraint from various known shapes, such as a granular shape, a particulate shape, and a spherical shape, according to the above purposes, although a spherical granule is most preferable because it realizes the following advantages:

High packing density can be achieved during transport and preparation.

Time required for slurrying becomes determinable. The advantage is especially marked if particle diameter is uniform.

Since it is prevented that part of a granule breaks off due to friction or a little pressure, it is easy to handle compared with a granule in an indeterminate shape, because it is prevented that part of a granule breaks off due to friction or a little pressure.

Also, when it is used as a carrier of olefin polymerization catalyst, since the obtained polymer has a similar shape to that of silica carrier, a spherical shape is preferred to an indeterminate shape.

(3-ii) Spherical Silica Particles

Spherical silica particles are useful for various catalysts, carriers for liquid chromatography, and other various fields. As the conventional technique for producing such spherical silica particles, the following three examples are mentioned.

(a) Method of neutralizing water glass with acids, such as sulfuric acid, and then gelating. Immediately after neutralization, the sol is exposed to air or dispersed into a solvent having no affinity for the sol with stirring so that it forms a spherical shape in terms of the surface tension, and then the sol is gelated. An example of the method is described, for example, in Japanese Patent Laid-Open publication No. HEI 11-292529.

(b) Method of hydrolyzing alkoxysilane and then gelating. Sol generated by hydrolysis of alkoxysilane is dispersed into a solvent having no affinity for sol with stirring so that it forms a spherical shape in terms of the surface tension, and then the sol is gelated. Examples of the method are described, for example, in Journal of Chromatography, 83, 5 (1973) and Japanese Patent Laid-Open publication No. HEI 2-22121.

(c) Method of using alkoxysilane or water glass as silica source and forming pores with a surfactant as an organic template (the so-called micelle-templated silica technique). The sol generated is dispersed into a solvent having no affinity for sol with stirring so that it forms a spherical shape in terms of the surface tension, and then the sol is gelated. An example of the method is described, for example, in Japanese Patent Laid-Open publication No. 2001-2409.

In the method (a) and method (b), the spherical silica hydrogel, which is obtained by gelation, is subjected to hydrothermal treatment, so that pore properties can be controlled in various ways. In the method (c), the surfactant used is removed by washing with a good solvent or by calcinating, micelle-templated silica with a uniform pore diameter can be obtained.

However, in the technique (a), there is a problem in that the obtained silica includes a high content of metal impurities, especially alkali metal or alkaline-earth metal, originating from water glass and is lacking in stability of properties. Besides, since gelation reaction occurs rapidly, it is difficult to control reaction. Hence, there arises another problem in that the obtained silica exhibits irregularity of quality in each lot or between lots, or tends to have structure of uneven quality, so that it is difficult to obtain spherical silica particles which maintain sufficiently sharp pore distribution after hydrothermal treatment.

On the other hand, in the technique (b), since alkoxysilane, which includes relatively low content of impurities, is used as silica source, it is possible to obtain spherical silica particles of high purity. However, according to the method described in Journal of Chromatography, 83, 5 (1973), there is a problem in that it is difficult to obtain spherical silica particles with a large pore diameter and sharp pore distribution. And according to the method described in Japanese Patent Laid-Open publication No. HEI 2-22121, although sharp pore distribution is realized, there is a problem in that calcination at a high temperature of 1000° C. or more is indispensable, and also that it is difficult to precisely control a pore diameter. Although it is possible to apply a technique of carrying out hydrothermal treatment on the spherical silica hydrogel obtained by hydrolysis of alkoxysilane to thereby control pore properties, there is no instance yet reported which succeeds in producing spherical silica particles having sufficiently sharp pore distribution.

Finally, according to the technique (c), it is possible to obtain spherical silica particles with highly sharp pore distribution. However, there is a problem in that the technique costs a great deal since it uses an expensive organic template, and also in that it is inferior in productivity because the production process is complicated.

Although the conventional techniques relating spherical silica particles have such problems as described above, by using the silica according to the present invention, it is possible to obtain spherical silica particles having low contents of unwanted impurities and sharp pore distribution, being superior in stability of properties, and also being superior in productivity because of little production cost, namely, possesses various kinds of desirable characteristics with sufficient balance.

When the silica of the present invention is used in the form of spherical particles, a ratio of (minor diameter)/(major diameter) is usually between 0.9 and 1 and preferably 0.95 and 1. It is further preferable that the silica particles are formed in spherical or substantially spherical shape. Particles of the silica the present invention are, by controlling their shape as described above, suitably used for various fields such as various catalyst carriers, carriers for liquid chromatography, fillers for sealing material of semiconductor, various adsorbents, separating mediums, drug carriers, and others.

When the silica of the present invention is used in the form of spherical particles, the value of pore volume is usually 0.6 ml/g or more, preferably 0.7 ml/g or more and usually 1.6 ml/g or less. And the value of specific surface area is usually 200 m$^2$/g or more, preferably 250 m$^2$/g or more, further preferably 300 m$^2$/g or more, still further preferably 500 m$^2$/g or more and usually 1000 m$^2$/g or less, preferably 950 m$^2$/g or less, further preferably 900 m$^2$/g or less.

In order to form the silica according to the present invention into spherical particles, it is required first that during the step of hydrolyzing silicon alkoxide to obtain silica hydrogel, the silica hydrogel is made into droplets in spherical or substantially spherical shape.

Conventional techniques for making silica hydrogel into spherical or substantially spherical droplets are generally classified into two methods: a method of exposing the hydrosol, which is about to gelate, to air; and a method of dispersing the hydrosol, which is about to gelate, into a solvent having no affinity for the sol with stirring so that it forms a spherical shape in terms of the surface tension. In the former method, in order to cause rapid gelation of the hydrosol droplets, it is often necessary to apply the additional processes such as adding a relatively strong catalyst to the hydrosol, dropping the droplets into a organic solvent to which a catalyst is add, or exposing the droplets to a severe condition with a high temperature and low pressure. Since any of these additional processes accelerates aging or drying of the generated spherical hydrogel, the former method is undesirable. On the contrast, the latter method can gelate the silica hydrogel slowly without inducing unwanted aging and is therefore preferably used for producing spherical particles of the silica according to the present invention.

In the latter method, if a solvent having compatibility with water, such as alcohols, is added upon hydrolysis of silicon alkoxide, it is preferable to select an organic solvent having a weak affinity with a solvent into for dispersion beforehand. Further, since droplets dispersed into a solvent during gelating process passes through a viscous sol state, the generated spherical hydrogel particles are apt to unit to form a glob. For preventing such generation of a glob, it is necessary to add a surfactant component into the system according to circumstances, although it requires only a far smaller amount of surfactant than the amount required for generating the above micelle-templated silica.

Thus-obtained spherical silica hydrogel is took out from the dispersion solvent in such a manner that aging or drying does not proceed and, if necessary, after washing a surfactant or a dispersion solvent adhered to the surface lightlyin such a condition as not to alter the composition of silica hydrogel in a liquid state, is subjected to the subsequent hydrothermal treatment.

Methods used for making the silica hydrogel into spherical shape are not limited to the above-described example, and any of various known methods is applicable unless it accelerates substantial aging of the silica hydrogel.

The silica of the present invention made in the form of spherical particles is useful as various catalyst carriers, carriers for liquid chromatography, fillers for sealing material of semiconductor, various adsorbents, separating mediums, and drug carriers, because it has the following properties:

Since the silica particles have improved water-resistance and are hence hard to crack, generation of fine dust due to cracking is prevented during the use for the above purposes, and also pressure damage is prevented during a continuous liquid flow.

In the use as various catalysts, since the silica particles are easy to move freely during the reaction, so that abrasion resistance is improved.

packing density to a column or a reaction vessel is improved.

Since local cubical expansion due to the change of water absorption or temperature is prevented, the silica particles are hard to crack even in a long use.

In addition, because the above purposes requires superior heat resistance and water resistance, well-controlled pore properties, and the fact that physical properties scarcely change over a long period of time are required among the above-mentioned applications, the silica according to the present invention, which possesses all of these properties, is suitably used especially for the above purposes.

EXAMPLES

The present invention will hereinafter be described in more detail by the following Examples. However, the present invention is not limited to the following Examples unless the gist thereof is overstepped.

[A] Hardness Measurement of Silica Hydrogel:

A silicon alkoxide was reacted with water of an amount 6 times by mol as much as the alkoxide in a 5-L separable flask, and a reaction mixture was taken out from the flask after the temperature of the reaction mixture reached the boiling point of the alcohol formed through the reaction. A certain amount (about 20 mm in terms of a depth of the liquid) of the reaction mixture taken out was transferred to a 50-cc glass-made screw tube, and the tube was stoppered and held in a water bath substantially controlled at a fixed temperature to measure the breaking strength of this silica hydrogel by means of a digital force gauge (AD-4935 Model, manufactured by A and D Co.) with the passage of aging time. A probe (stainless steel-made round bar having a diameter of 5 mm) was installed in this measuring apparatus so as to compress and break the hydrogel held in the container by slowly inserting the round bar into the hydrogel. A maximum stress value indicated until the hydrogel was compressed and broken was regarded as breaking stress.

The result of the measurement is illustrated in FIG. 1, which is a graph obtained by plotting a common logarithm of the aging time on an axis of abscissa and the breaking stress on an axis of ordinate. It is understood from FIG. 1 that the breaking stress becomes greater as the aging time passes, and that the aging speed depends on the temperature.

[B] Example/Comparative Example Group I:

(1) Analytical Method of Silica:

(1-1) Measurement of Total Pore Volume, Specific Surface Area and Differential Pore Volume:

A BET nitrogen absorption isotherm was measured by means of AS-1 manufactured by Quanthachrome Co. to obtain a total pore volume and a specific surface area. Specifically, a measured value at a relative pressure $P/P_0=0.98$ was adopted for the pore volume, and the specific surface area was calculated out from the amount of nitrogen absorbed at relative pressures $P/P_0=0.1$, 0.2, and 0.3 using BET multipoint method. Further, a pore distribution curve and a differential pore volume in a mode diameter ($D_{max}$) were obtained by BJH method. The interval between the relative pressures of the respective measurement points was determined to be 0.025.

(1-2) Powder X-ray Diffractometry Measurement:

Measurement was performed using an RAD-RB apparatus manufactured by Rigaku Industrial Co. and CuKα as a radiation source. A divergent slit, a scattering slit and a receiving slit were determined to be ½ deg, ½ deg and 0.15 mm, respectively.

(1-3) Measurement of the Content of Metallic Impurities:

After hydrofluoric acid was added to a silica sample (2.5 g), the mixture was heated and dried to solid. And then water was added to make the total volume 50 ml. This aqueous solution was used to conduct ICP emission spectrometry. Sodium and potassium were analyzed by a flame spectrochemical analysis.

(1-4) Solid-State Si NMR Measurement:

Measurement was performed using a solid state NMR apparatus ("MSL300") manufactured by Bruker Co., a resonance frequency of 59.2 MHz (7.05 tesla), and a sample tube having a diameter of 7 mm under conditions of CP/MAS (cross polarization/magic angle spinning) probe. Specific measurement conditions are shown in the following Table I-1.

TABLE I-1

| | |
|---|---|
| Spining rate | 5,000 rps |
| Spectral width | 20,000 Hz |
| Data point | 4096 |
| Standard at 0 ppm | Using tetramethylsilane |
| Secondary standard (−9.66 ppm) | Using hexamethylcyclotrisiloxane |
| Recycle time | 400 seconds |
| Broadening factor | 100 Hz (using a Lorentz function upon Fourier transformation) |
| Measuring temperature | 25° C. |
| Decoupling magnitude of protons | 50 kHz |

The analysis (determination of $Q^4$ peak position) of the measured data is performed by deconvolution of a specrtum and extracting each peak. Specifically, curve fitting analysis using a Gaussian function is performed. Curve fitting software "GRAMS 386" produced by Thermogalatic Co. can be used in this analysis.

Using areas of $Q^4$ and $Q^3$ peaks thus-determined by the peak division technique, the ratio of areas these peaks ($Q^4/Q^3$) was calculated.

(1-5) Hydrothermal Stability Test:

Purified water was added to a silica sample to prepare a 40 wt % slurry. About 40 ml of the slurry prepared above was placed in a stainless steel-made microbomb having a volume of 60 ml, and the bomb was sealed and immersed in an oil bath of 280±1° C. for 3 days. A part of the slurry was taken out of the microbomb and filtered through 5A filter paper. After the filtration, the residual cake was dried under reduced pressure at 1000° C. for 5 hours, the specific surface area of the residual sample was measured.

(2) Preparation and Evaluation of Silica:

Examples I-1 to I-3

A 5-L glass separable flask (jacketed) equipped with a water-cooling condenser opened to the air at the upper part thereof was charged with purified water (1,000 g). While stirring at such a stirring speed that the speed of the edges of stirring blades was 2.5 m/s, tetramethoxysilane (1,400 g) was charged over 3 minutes into the flask. A molar ratio of water to tetramethoxysilane was approximately 6. Hot water of 50° C. was passed through the jacket of the separable flask. The stirring was successively continued and stopped at the time the temperature of the contents reached mixture's the boiling point. Hot water of 50° C. was successively passed through the jacket for about more 0.5 hours to gelate the sol formed. Thereafter, the gel was rapidly taken out of the flask and squeezed through a nylon screen having a mesh opening of 600 μm to be crushed, thereby obtained powdery wet gel (silica hydrogel). This hydrogel (450 g) and purified water (450 g) were charged into a 1-L glass-made autoclave and subjected to a hydrothermal treatment under the conditions at 130° C. for 3 hours (for Example I-1), at 150° C. for 3 hours (for Example I-2), and at 200° C. for 3 hours (for Example I-3), respectively. After the hydrothermal treatment was performed for the prescribed period of time, each reaction mixture was filtered through No. 5A filter paper. Without washing with water, the resultant filter cakes were dried completely under reduced pressure at 100° C., thereby silica samples according to Examples I-1 to I-3 were obtained.

Example I-4

Hydrogel was prepared under the same conditions as those for Examples I-1 to I-3. The resultant hydrogel (450 g) and 0.56% aqueous ammonia (450 g) were charged into a 1-L autoclave and subjected to a hydrothermal treatment under the condition at 60° C. for 3 hours. After the hydrothermal treatment was performed for the prescribed period of time, the reaction mixture was filtered through No. 5A filter paper. Without washing with water, the resultant silica was dried completely under reduced pressure at 100° C. to obtain silica according to Examples I-4.

Various physical properties of the silica obtained in Examples I-1 to I-4 are shown in Tables I-2 and I-4. No peak attributable to crystallinity appeared on the powder X-ray diffraction patterns of all the silica samples, and no peak attributable to periodic structure was observed on the low-angle side ($2\theta \leq 5$ deg). With respect to the contents of metallic impurities in the silica samples according to Examples I-1 to I-4, sodium was 0.2 ppm, potassium was 0.1 ppm, and calcium was 0.2 ppm in any silica samples of Examples I-1 to I-4, and any other metals were not detected.

Figure 2:
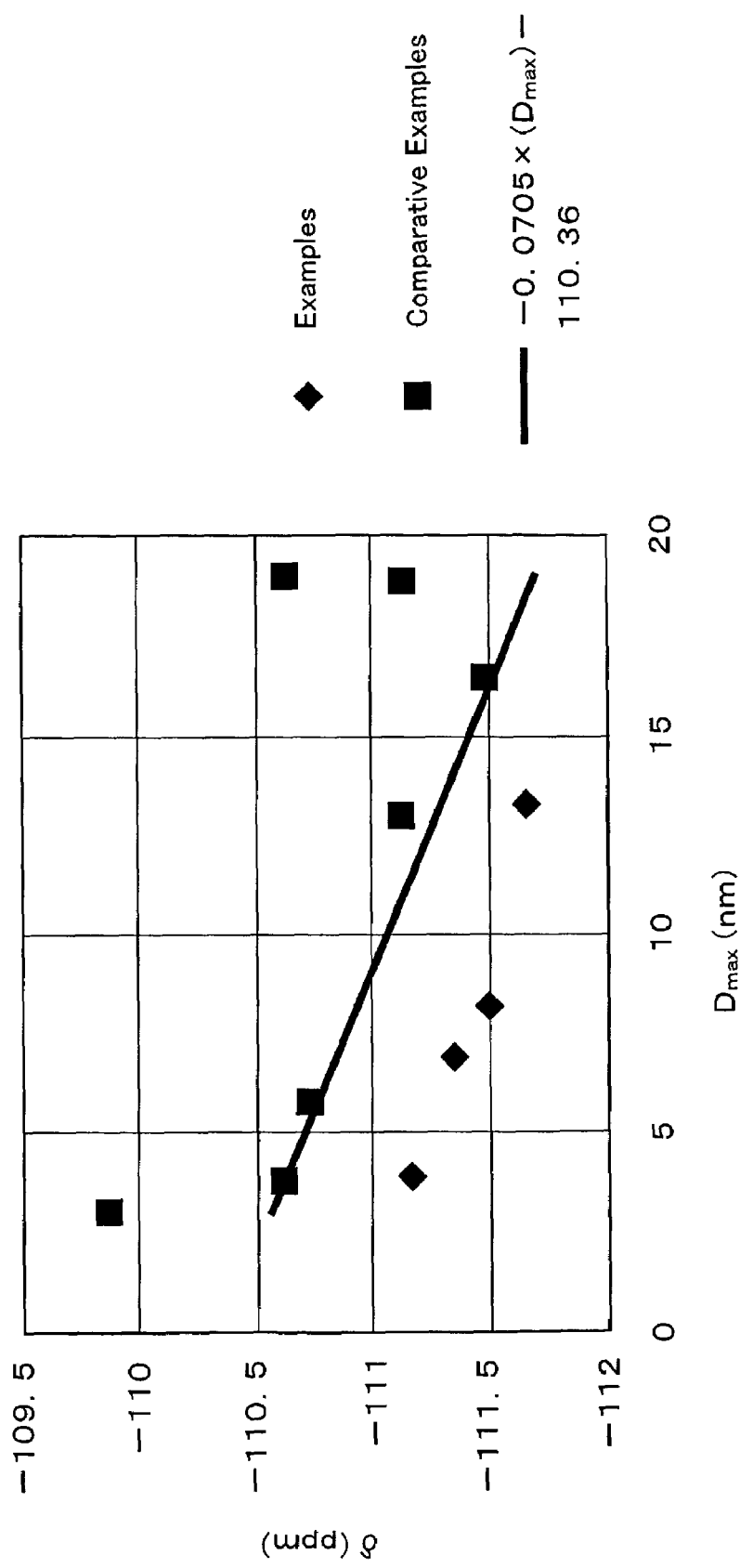
FIG. 2 is a graph showing correlations between mode pore diameters $D_{max}$ and chemical shift values $\delta$ of $Q^4$ peak regarding silica according to Embodiments and Comparative Examples of the present invention.

FIG. 2 illustrates a graph showing correlations between mode pore diameters ($D_{max}$) and chemical shift values ($\delta$) of $Q^4$ peaks regarding the silica samples according to Examples I-1 to I-4 and Comparative Examples I-1 to I-7, which will be described subsequently. As apparent from FIG. 2, all the chemical shift values (values plotted as series 1 in the graph in FIG. 2) of the $Q^4$ peak in solid-state Si NMR for the silica samples of Examples I-1 to I-4 fell within a smaller region compared with values (values represented by a black line in the graph in FIG. 2) calculated from the left side ($-0.0705 \times (D_{max}) - 110.36$) of the inequality (I).

Examples I-5

Silica was prepared under the same condition as that for Examples I-1 except that a 6-L SUS316-made autoclave was used and the hydrothermal treatment was carried out at 160° C. for 3 hours. The mean particle diameter of the silica obtained is 331 μm.

A jet mill grinding was performed on the silica for 26 minutes using a 100AFG-type grinder manufactured by HOSOKAWA MICRON Corp. so that the mean particle diameter of the resultant silica became 5.3 μm. The grinding and the classification were performed under the following conditions.

Amount of the air: 0.72 m 3/min
Pressure of the air: 0.59 Mpa
Nozzle diameter×number: ϕ1.9 mm×three
Type of classifying machine: 50ATP
Speed of rotation: 17800 rpm
Dust collection fabric: bug filter
Performance: 0.97 kg/h The physical properties of the resultant silica are shown below. The other undescribed properties are identical to those of the silica of Example I-2, which is shown in Table I-2.

Specific surface area: 620 m²/g
Total pore volume: 1.04 cc/g
Mode diameter $D_{max}$: 7.0 nm
Differential pore volume at $D_{max}$: 6 ml/g Examples I-6

Silica was prepared under the same condition as that for Example I-2 except that a nylon screen having a mesh opening of 5 mm was substituted for that having a mesh opening of 600 μm. The mean particle diameter of the silica obtained is 2.8 mm (=2800 μm).

The physical properties of the resultant silica are shown below. The other undescribed properties are identical to those of the silica of Example I-2, which is shown in Table I-2.

Specific surface area: 545 m²/g
Total pore volume: 1.01 cc/g
Mode pore diameter $D_{max}$: 7.1 nm
Differential pore volume at $D_{max}$: 7 ml/g The silica obtained in Example I-5, whose mean particle diameter is 5.3 μm, has a sharp pore distribution and a large pore volume despite of the small particle diameter, as apparent from the physical properties listed above. It is therefore obvious that the silica has high water absorbency and thus can give a humidity adjusting function to various materials. And this silica may be preferably used, for example, for fillers of various films, which requires high surface smoothness and anti-blocking capability.

The large-particle silica whose mean particle diameter is larger than 500 μm, which was obtained in Example I-6, is especially suitable for a catalyst carrier and an absorbent agent because the pressure drop must be very little when the silica is used in a tower. Further, since the silica of Example I-6 is of high purity and contains a small amount of impurities, it is possible to prolong the lifetime period with less deterioration over times when used as a catalyst carrier or the like. In addition, because of its high purity and sharp pore distribution, the silica has the ability to remove a target compound with high selectivity and can be preferably used also in the producing fields of food and medicine.

In addition, the following silica samples were also prepared Comparative Examples I-1 to I-6.

Comparative Example I-1

Silica CARIACT G-3 produced by Fuji Silysia Chemical Co., Ltd. was used.

Comparative Example I-2

Silica CARIACT G-6 produced by Fuji Silysia Chemical Co., Ltd. was used.

Comparative Example I-3

Silica CARIACT G-10 (Lot No. 703091) produced by Fuji Silysia Chemical Co., Ltd. was used.

Comparative Example I-4

Silica CARIACT G-10 (Lot No. C-0009014) produced by Fuji Silysia Chemical Co., Ltd. was used.

Comparative Example I-5

Silica CARIACT Q-15 produced by Fuji Silysia Chemical Co., Ltd. was used.

Comparative Example I-6

Mizukasorb C-1 produced by Mizusawa Industrial Chemicals, Ltd. was used.

Various physical properties of the silica samples of Comparative Examples I-1 to I-6 are shown in Tables I-2 to I-4. No peaks attributable to crystallinity appeared on the powder X-ray diffraction patterns of all the silica samples of Comparative Examples I-1 to I-6, and no peaks attributable to periodic structure were observed on the low-angle side. The contents of the metallic impurities were measured and the results are shown in the following tables. The silica samples according to Comparative Examples I-1 to I-6 contained larger quantities of metallic impurities than the those of Examples I-1 to I-4 contained. As apparent from FIG. 2, the chemical shift values (values plotted as series 2 in the graph in FIG. 2) of the $Q^4$ peak in solid-state Si NMR for the silica samples of Comparative Examples I-1 to I-6 fell within a larger region compared with values (values represented by a black line in the graph in FIG. 2) calculated from the left side of the inequality (I). It is thus considered that the silica samples according to Comparative Examples I-1 to I-6 have highly distorted structure compared with the those of Examples I-1 to I-4, and therefore might tend to readily undergo changes of physical properties.

The silica samples of Examples I-1 to I-4 and Comparative Examples I-1 to I-6 were subjected to hydrothermal stability tests under the above-described conditions in order to measure the specific surface areas thereof, the results of which measurement are shown in Tables I-2 and I-3. The silica samples of Examples I-1 to I-4 had less loss in their specific surface areas compared with the silica samples of Comparative Examples I-1 to I-6 and were thus excellent in hydrothermal stability.

TABLE I-2

|  | Ex. I-1 | Ex. I-2 | Ex. I-3 | Ex. I-4 |
|---|---|---|---|---|
| Mode diameter $D_{max}$ (nm) | 3.9 | 6.9 | 13.3 | 8.2 |
| Differential pore volume at $D_{max}$ (ml/g) | 8 | 11 | 11 | 6 |
| Specific surface area (m$^2$/g) | 842 | 712 | 419 | 442 |
| Total pore volume (ml/g) | 0.89 | 1.23 | 1.60 | 1.11 |
| Ratio of the volume of the pores whose diameters are within a range of $D_{max} \pm 20\%$ to the total pore volume (%) | 63 | 71 | 78 | 69 |
| $Q^4/Q^3$ | 1.7 | 2.3 | 3.6 | 3.2 |
| Contents of all metallic impurities (ppm) | 0.5 | 0.5 | 0.5 | 0.5 |
| Contents of alkali metals and alkaline earth metals (ppm) | 0.5 | 0.5 | 0.5 | 0.5 |
| Specific surface area after a hydrothermal stability test (m$^2$/g) | 54 | 48 | 57 | 58 |
| Mean particle diameter (μm) | 300 | 4350 | 400 | 380 |

TABLE I-3

|  | Comp. Ex. I-1 | Comp. Ex. I-2 | Comp. Ex. I-3 | Comp. Ex. I-4 | Comp. Ex. I-5 | Comp. Ex. I-6 |
|---|---|---|---|---|---|---|
| Mode diameter $D_{max}$ (nm) | 3.0 | 6.6 | 13.3 | 18.9 | 16.5 | 19.3 |
| Differential pore volume at $D_{max}$ (ml/g) | 0.3 | 3 | 5 | 3 | 8 | 6 |
| Specific surface area (m$^2$/g) | 864 | 599 | 359 | 413 | 204 | 329 |
| Total pore volume (ml/g) | 0.51 | 0.91 | 1.38 | 1.20 | 1.08 | 1.80 |
| Ratio of the volume of the pores whose diameters are within a range of $D_{max} \pm 20\%$ to the total pore volume (%) | 18 | 48 | 49 | 33 | 60 | 51 |
| $Q^4/Q^3$ | 1.4 | 2.6 | 3.8 | 3.8 | 3.6 | 4.6 |
| Contents of all metallic impurities (ppm) | 402 | 734 | 790 | 809 | 189 | 639 |
| Contents of alkali metals and alkaline earth metals (ppm) | 51 | 384 | 442 | 461 | 41 | 258 |
| Specific surface area after a hydrothermal stability test (m$^2$/g) | 28 | 4 | 3 | 3 | 10 | 10 |

TABLE I-4

|  | $D_{max}$ (nm) | Chemical shift of $Q^4$ peak (ppm) | $-0.0705 \times (D_{max}) - 110.36$ (ppm) |
|---|---|---|---|
| Ex. I-1 | 3.9 | −111.17 | −110.64 |
| Ex. I-2 | 6.9 | −111.35 | −110.85 |
| Ex. I-3 | 13.3 | −111.66 | −111.30 |
| Ex. I-4 | 8.2 | −111.5 | −111.30 |
| Comp. Ex. I-1 | 3.0 | −109.87 | −110.57 |
| Comp. Ex. I-2 | 5.8 | −110.73 | −110.77 |
| Comp. Ex. I-3 | 13.0 | −111.12 | −111.28 |
| Comp. Ex. I-4 | 18.9 | −111.12 | −111.69 |
| Comp. Ex. I-5 | 16.5 | −111.48 | −111.52 |
| Comp. Ex. I-6 | 19.3 | −110.62 | −111.72 |

[C] Example/Comparative Example Group II:

(1) Analytical Method of Silica:

The analyses were basically conducted under the same conditions as those of Example/Comparative Example Group I. Only analytical methods different from Example/Comparative Example Group I will hereinafter be described.

(1-6) Heat Resistance Test:

After a sample (5 g) was placed in a quartz beaker, heated to 1,000° C. at a rate of 200° C./hr under an air atmosphere in an electric oven and held for 1 hour, the beaker was immediately taken out at room temperature and allowed to cool. The specific surface area of this sample was measured by BET method.

(1-7) Crushing Strength Test:

A tablet-forming machine for IR (diameter of tablet: 20 mm) was used as a crusher and the specific surface area and pore volume of a sample before and after crushing were measured by BET method. The sample was evaluated as to the degree of difference between measured values before and after crushing. When no great difference arose between the measured values before and after crushing, it was judged that the strength of structural elements as to the specific surface area and pore volume of the silica sample is high. The crushing of the sample was performed using the sample (1.4±0.2 g) and applying a pressure of 4.0 ton/cm² to the sample at atmospheric temperature for 3 minutes.

(1-8) Measurement of Concentration of Sulfur (S)

Some tin particles (combustion improver) were mixed with a silica sample (0.5 g), and the mixture was heated to 1450° C. under an oxygen stream to be melted. A content of sulfur in the sample migrated into oxygen stream by combustion was measured. A carbon and sulfur analyzer "EMIA610" manufactured by Horiba Ltd. was used for this measurement.

(1-9) Measurement of Concentration of Chlorine (Cl):

A silica sample (0.5 g) was heated to 1,100° C. and a combustion gas was analyzed by means of a total organic halogen analyzer ("TOX-100" manufactured by Dia Instruments Co.)

(1-10) Measurement of Concentration of Nitrogen (N):

A silica sample (0.5 g) was heated to 1,100° C., and a combustion gas was collected in a dilute aqueous solution of caustic soda and analyzed by means of a total nitrogen analyzer ("TN-05" manufactured by Dia Instruments Co.).

(1-11) Measurement of pH of Silica Slurry:

A silica sample was mixed with demineralized water to prepare a slurry having a solid concentration of 50 wt %. The pH of this slurry was measured by means of a glass electrode type pH meter ("HM-30S" manufactured by To a Electronics Ltd.).

(1-12) Corrosion Test:

A 50 wt % silica slurry (40 ml) was put in an SUS 304-made microbomb having a volume of 60 ml, and the bomb was sealed and immersed for 72 hours in an oil bath of 280° C. The slurry was then taken out of the microbomb and the conditions of the slurry and the inner wall of the microbomb were observed through a microscope.

(1-13) Measurement of the Contents of Metals in Silica after Corrosion Test:

Solids in the slurry after the corrosion test were separated by means of 5A filter paper and dried under reduced pressure at 100° C. for 5 hours. After hydrofluoric acid was added to this sample (2.5 g), the mixture was heated and dried to solids. And then water was added to make the total volume 50 ml. This aqueous solution was subjected to ICP analysis.

(2) Preparation and Evaluation of Silica:

Examples II-1

A 5-L separable flask (jacketed) equipped with a water-cooling condenser opened to the air at the upper part thereof was charged with purified water (1,000 g). While stirring at such a stirring speed that the speed of the edges of stirring blades was 2.5 m/s, tetramethoxysilane (1,400 g) was charged over 3 minutes into the flask. A molar ratio of water to tetramethoxysilane was about 6. Hot water of 50° C. was passed through the jacket of the separable flask. The stirring was successively continued and stopped at the time the temperature of the contents reached the mixture's boiling point. Hot water of 50° C. was successively passed through the jacket for more about 0.5 hours to gelate the sol formed.

Thereafter, the gel was rapidly taken out of the flask and squeezed through a nylon screen having a mesh opening of 600 μm to be crushed, thereby obtained powdery wet gel (silica hydrogel). This hydrogel (450 g) and purified water (450 g) were charged into a 1-L glass-made autoclave and subjected to a hydrothermal treatment at 130° C. for 3 hours. The reaction mixture was filtered through No. 5A filter paper. Without washed with water, the resultant filter cake was dried completely under reduced pressure at 100° C. The contents of metallic impurities in the thus-obtained silica were measured: sodium was 0.2 ppm, potassium was 0.1 ppm, calcium was 0.2 ppm, but none of magnesium, aluminum, titanium and zirconium were detected. Other physical properties of the silica samples are shown in Tables II-1 and II-2.

Comparative Example II-1

A silica sample was prepared in the same manner as in Example II-1 except that 0.1 N hydrochloric acid was used in place of water upon the hydrolysis of tetramethoxysilane in Example II-1, and the resultant gel was washed with demineralized water after the hydrothermal treatment. Physical properties of the silica sample thus obtained are shown in Tables II-1 and II-2.

Comparative Example II-2

A silica sample was prepared in the same manner as in Example II-1 except that 0.1 N nitric acid was used in place of water upon the hydrolysis of tetramethoxysilane in Example II-1, and the resultant gel was washed with demineralized water after the hydrothermal treatment. Physical properties of the silica thus obtained are shown in Tables II-1 and II-2.

Comparative Example II-3

Silica "G-3" (crushed) of "CARIACT G series" silica produced by Fuji Silysia Chemical Co., Ltd. was used as a representative of commercially available general silica for the sake of comparison with the silica according to the present invention. In this connection, the contents of metallic impurities in the commercially available silica ("G-6") were measured: sodium was 170 ppm, magnesium was 31 ppm, aluminum was 15 ppm, potassium was 23 ppm, calcium was 160 ppm, titanium was 260 ppm, and zirconium was 44 ppm. Other physical properties of each silica sample are shown in Tables II-1 and II-2.

TABLE II-1

|  | Ex. II-1 | Comp. Ex. II-1 | Comp. Ex. II-2 | Comp. Ex. II-3 |
|---|---|---|---|---|
| Total pore volume (ml/g) | 0.85 | 0.56 | 0.58 | 0.53 |
| Specific surface area (m²/g) | 859 | 820 | 835 | 885 |
| $D_{max}$ (nm) | 3.9 | 3.5 | 3.5 | * |
| Ratio of the volume of the pores whose diameters are within a range of $D_{max} \pm 20\%$ to the total pore volume (%) | 61 | 45 | 40 | * |
| Differential pore volume at $D_{max}$ (ml/g) | 7.7 | 2.5 | 2.7 | * |
| $Q^4/Q^3$ | 1.7 | 1.5 | 1.4 | 1.4 |
| Specific surface area after a heat resistance test (m²/g) | 475 | 296 | 315 | 30 |
| Specific surface area after a hydrothermal stability test (m²/g) | 57 | 45 | 48 | 26 |
| Specific surface area after a crushing strength test (m²/g) | 791 | 712 | 705 | 572 |
| Pore volume after a crushing strength test (ml/g) | 0.62 | 0.38 | 0.38 | 0.32 |

(*: Immeasurable because no peak appeared)

TABLE II-2

|  | Ex. II-1 | Comp. Ex. II-1 | Comp. Ex. II-2 | Comp. Ex. II-3 |
|---|---|---|---|---|
| Concentration of S (ppm) | <1 | — | — | 51 |
| Concentration of Cl (ppm) | <1 | 30 | — | — |
| Concentration of N (ppm) | <1 | — | 25 | — |
| pH of slurry | 4.82 | 3.20 | 2.00 | 2.80 |
| Concentration of metals after a corrosion test  Fe (ppm) | <0.1 | 25.0 | 34.2 | 55.2 |
| Concentration of metals after a corrosion test  Cr (ppm) | <0.1 | 0.7 | 0.6 | 1.0 |
| Observation result after corrosion test | Usual in both slurry and bomb wall | Both slurry and bomb wall were colored dark brown; corrosion holes were slightly observed in bomb wall | Both slurry and bomb wall were colored pale yellow | Both slurry and bomb wall were colored dark brown |

[D] Example/Comparative Example Group III:

(1) Analytical Method of Silica:

The analyses were basically conducted under the same conditions as those of Example/Comparative Example Groups I and II. Only an analytical method different from Example/Comparative Example Groups I and II will hereinafter be described.

(1-14) Measurement of Small-Angle X-ray Scattering Spectrum of Silica:

A RAD-B apparatus manufactured by Rigaku Industrial Co. was used to conduct the measurements in accordance with the method described above in the specification. Specifically, the measurement was performed in the following manner. Only CuKα rays were taken out by a Side-by-Side mirror manufactured by OSMIC Co. A sample was irradiated with incident X-rays through 2 rounded slits (diameters: 0.8 mm and 0.6 mm, respectively), and scattered X-rays were passed through a vacuum path and detected by a position sensitive proportional counter (PSPC) provided with a camera. (The distance from the sample to the camera was 1,412 mm). Scattered X-rays having Q not exceeding 0.010 were removed by a stopper so as not to detect direct beams.

(2) Preparation and Evaluation of Silica:

Examples III-1

A 5-L separable flask (jacketed) equipped with a water-cooling condenser opened to the air at the upper part thereof was charged with purified water (1,000 g). While stirring at such a stirring speed that the speed of the edges of stirring blades was 2.5 m/s, tetramethoxysilane (1,400 g) was charged over 3 minutes into the flask. A molar ratio of water to tetramethoxysilane was about 6. Hot water of 50° C. was passed through the jacket of the separable flask. The stirring was successively continued and stopped at the time the temperature of the contents reached the mixture's boiling point. Hot water of 50° C. was successively passed through the jacket for more about 0.5 hours to gelate the sol formed. The hardness of the gel thus obtained was 1.5 MPa.

Thereafter, the gel was rapidly taken out of the flask and squeezed through a nylon screen having a mesh opening of 600 μm to be crushed, thereby obtained powdery wet gel (silica hydrogel). This hydrogel (450 g) and purified water (450 g) were charged into a 1-L glass-made autoclave and subjected to a hydrothermal treatment at 130° C. for 3 hours. The reaction mixture was filtered through No. 5A filter paper. Without washing with water, the resultant filter cake was dried under completely reduced pressure at 100° C. The contents of metallic impurities in the thus-obtained silica were measured: sodium was 0.2 ppm, potassium was 0.1 ppm, calcium was 0.2 ppm, but none of magnesium, aluminum, titanium and zirconium were detected. Other physical properties of the silica samples are shown in Tables III-1 and III-2.

Example III-2

A silica sample was obtained in the same manner as in Example III-1 except that the amount of water upon the hydrolysis in Example II-1 was changed to 1,333 g (molar ratio of water/tetramethoxysilane=8). Measured results of the physical properties thereof are shown in Tables III-1 and III-2.

Comparative Examples III-1 and III-2

Silica "G-6" and "G-10" (crushed) of "CARIACT G series" silica for carrying a catalyst produced by Fuji Silysia Chemical Co., Ltd. were used as representatives of commercially available general silica for the sake of comparison with the silica according to the present invention to regard them as Comparative Examples III-1 and III-2, respectively. The contents of metallic impurities in these silica samples were measured: sodium was 170 ppm, magnesium was 31 ppm, aluminum was 15 ppm, potassium was 23 ppm, calcium was 160 ppm, titanium was 260 ppm, and zirconium was 44 ppm. Other physical properties of these silica samples are shown in Tables III-1 and III-2.

TABLE III-1

| | Ex. III-1 | Ex. III-2 | Comp. Ex. III-1 | Comp. Ex. III-2 |
|---|---|---|---|---|
| Total pore volume (ml/g) | 0.85 | 0.70 | 0.57 | 1.38 |
| Specific surface area (m$^2$/g) | 859 | 835 | 423 | 359 |
| $D_{max}$ (nm) | 3.9 | 3.9 | 6.6 | 13.5 |
| Ratio of the volume of the pores whose diameters are within a range of $D_{max} \pm 20\%$ to the total pore volume (%) | 61 | 51 | 36 | 51 |
| Differential pore volume at $D_{max}$ (ml/g) | 7.7 | 6.2 | 1.9 | 4.7 |
| $Q^4/Q^3$ | 1.7 | 1.5 | 2.6 | 3.8 |
| Specific surface area after a heat resistance test (m$^2$/g) | 475 | 320 | 31 | 286 |
| Specific surface area after a hydrothermal stability test (m$^2$/g) | 57 | 10 | 4 | 3 |

TABLE III-2

| | Example | | Comparative Example | |
|---|---|---|---|---|
| | III-1 | III-2 | III-1 | III-2 |
| Inflection point in profile obtained by Guinier plot | No inflection point was observed in a region where q$^2$ value is not exceeding than 6 × 10$^{-3}$ (Å$^{-2}$) | The same as the left | A shoulder extending over a region where q$^2$ value is (1 to 5) × 10$^{-3}$ (Å$^{-2}$) was observed | The same as the left |

[E] Example/Comparative Example Group IV:

(1) Analytical Method of Silica:

The analyses were basically conducted under the same conditions as those for Example/Comparative Example Groups I to III. Only an analytical method different from Example/Comparative Example Groups I to III will hereinafter be described.

(1-15) Measurement of X-ray Transmittance of Silica:

A RAD-B apparatus manufactured by Rigaku Industrial Co. was used to conduct the measurements in accordance with the method described above in the specification.

(2) Preparation and Evaluation of Silica:

Examples IV-1

A 5-L separable flask (jacketed) equipped with a water-cooling condenser opened to the air at the upper part thereof was charged with purified water (1,000 g). While stirring at such a stirring speed that the speed of the edges of stirring blades was 2.5 m/s, tetramethoxysilane (1,400 g) was charged over 3 minutes into the flask. A molar ratio of water to tetramethoxysilane was about 6. Hot water of 50° C. was passed through the jacket of the separable flask. The stirring was successively continued and stopped at the time the temperature of the contents reached the mixture's boiling point. Hot water of 50° C. was successively passed through the jacket for more about 0.5 hours to gelate the sol formed. The hardness of the gel thus obtained was 1.5 MPa.

Thereafter, the gel was rapidly taken out of the flask and squeezed through a nylon screen having a mesh opening of 600 μm to be crushed, thereby obtained powdery wet gel (silica hydrogel). This hydrogel (450 g) and purified water (450 g) were charged into a 1-L glass-made autoclave, heated to 130° C. at a rate of 3° C./min and held at 130° C. temperature for 3 hours to conduct a hydrothermal treatment. The reaction mixture was then filtered through No. 5A filter paper. Without washing with water, the resultant filter cake was dried completely under reduced pressure at 100° C. to a constant weight to thereby obtain silica. The contents of metallic impurities in the thus-obtained silica sample were measured: sodium was 0.2 ppm, potassium was 0.1 ppm, calcium was 0.2 ppm, but none of magnesium, aluminum, titanium and zirconium were detected. Other physical properties of the silica sample are shown in Tables IV-1 and IV-2.

In order to confirm the uniformity in quality of the silica according to the present invention, the preparation of silica sample under the same conditions as described above was further repeated twice, and the respective pore volumes of the resultant three lots of silica samples were compared. The measurement results of the 3 lots are shown collectively in Table IV-3.

Example IV-2

A silica was obtained in the same manner as in Example IV-1 except that the hydrogel and water in Example IV-1 were heated to 150° C. at a rate of 3° C./min and held at 150° C. for 3 hours to conduct a hydrothermal treatment. Measurement results of the physical properties thereof are shown in Tables IV-1 and IV-2.

Example IV-3

A silica sample was obtained in the same manner as in Example IV-1 except that the hydrogel and water in Example IV-1 were heated to 200° C. at a rate of 3° C./min and held at 200° C. for 3 hours to conduct a hydrothermal treatment. Measurement results of the physical properties thereof are shown in Tables IV-1 and IV-2.

Example IV-4

A silica sample was obtained in the same manner as in Example IV-1 except that the hydrogel and water in Example IV-1 were heated to 130° C. at a rate of 0.1° C./min and held at 130° C. for 3 hours to conduct a hydrothermal treatment. Measurement results of the physical properties thereof are shown in Tables IV-1 and IV-2.

Comparative Examples IV-1 and IV-2

Silica "G-6" and "G-10" (crushed) of "CARIACT G series" silica produced by Fuji Silysia Chemical Co., Ltd. were used as representatives of commercially available general silica for the sake of comparison with the silica according to the present invention to regard them as Comparative Examples IV-1 and IV-2, respectively. The contents of metallic impurities in these silica samples were measured: sodium was 170 ppm, magnesium was 31 ppm, aluminum was 15 ppm, potassium was 23 ppm, calcium was 160 ppm, titanium was 260 ppm, and zirconium was 44 ppm. Other physical properties of these silica samples are shown in Tables IV-1 and IV-2.

In order to confirm the uniformity in quality of the silica, pore volumes of three lots of the respective silica samples were compared. The measurement results thereof are shown collectively in Table IV-3.

TABLE IV-1

|  | Example | | | | Comp. Example | |
| --- | --- | --- | --- | --- | --- | --- |
|  | IV-1 | IV-2 | IV-3 | IV-4 | IV-1 | IV-2 |
| Total pore volume (ml/g) | 0.85 | 1.19 | 1.5 | 0.78 | 0.57 | 1.38 |
| Specific surface area (m²/g) | 859 | 706 | 409 | 805 | 423 | 359 |
| $D_{max}$ (nm) | 3.9 | 6.9 | 13.3 | 4.2 | 6.6 | 13.5 |
| Ratio of the volume of the pores whose diameters are within a range of $D_{max}$ ± 20% to the total pore volume (%) | 61 | 69 | 77 | 50 | 36 | 51 |
| Differential pore volume at $D_{max}$ (ml/g) | 7.7 | 10.8 | 10.8 | 6.1 | 1.9 | 4.7 |
| $Q^4/Q^3$ | 1.7 | 2.3 | 3.6 | 1.9 | 2.6 | 3.8 |
| Specific surface area after a heat resistance test (m²/g) | 475 | 468 | 346 | 480 | 31 | 286 |
| Specific surface area after a hydrothermal stability test (m²/g) | 57 | 46 | 56 | 59 | 4 | 3 |

TABLE IV-2

|  | Example | | | | Comp. Example | |
| --- | --- | --- | --- | --- | --- | --- |
|  | IV-1 | IV-2 | IV-3 | IV-4 | IV-1 | IV-2 |
| $D_{max}$ | 3.9 | 6.9 | 13.3 | 4.2 | 6.6 | 13.5 |
| 4.98 ln ($D_{max}$) − 7.50 | −0.72 | 2.12 | 5.39 | −0.35 | 1.90 | 5.46 |
| X-ray transmittance T (%) | 0.76 | 4.77 | 8.23 | 0.50 | 1.79 | 5.12 |

TABLE IV-3

|  |  | Ex. IV-1 | Comp. Ex. IV-1 | Comp. Ex. IV-2 |
| --- | --- | --- | --- | --- |
| Total pore volume (ml/g) | Lot No. 1 | 0.85 | 0.57 | 1.38 |
|  | Lot No. 2 | 0.91 | 0.91 | 1.20 |
|  | Lot No. 3 | 0.88 | 0.75 | 0.90 |

[F] Example/Comparative Example Group V:

(1) Analytical Method of Silica:

The analyses were basically conducted under the same conditions as those for Example/Comparative Example Groups I to IV. Only an analytical method different from Example/Comparative Example Groups I to IV will hereinafter be described.

(1-16) Measurement of Wide-Angle X-ray Scattering Spectrum Pattern:

A RAD-B apparatus manufactured by Rigaku Industrial Co. was used to conduct the measurements in accordance with the method described above in the specification. Specifically, X-rays having output of 50 kV and 200 mA were emitted and take out only CuKα rays through a Ni filter. Then a vertical goniometer manufactured by Rigaku Industrial Co. was installed to conduct measurement by the transmission method. Scattered X-rays were passed through 2 line-type slits (widths: 0.5 mm and 1.0 mm, respectively) and detected by a sealed proportional counter.

(2) Preparation and Evaluation of Silica:

Examples V-1

A 5-L separable flask (jacketed) equipped with a water-cooling condenser opened to the air at the upper part thereof was charged with purified water (1,000 g). While stirring at such a stirring speed that the speed of the edges of stirring blades was 2.5 m/s, tetramethoxysilane (1,400 g) was charged over 3 minutes into the flask. A molar ratio of water to tetramethoxysilane was about 6. Hot water of 50° C. was passed through the jacket of the separable flask. The stirring was successively continued, and the temperature of the contents was kept at about from 60 to 70° C. to avoid an uncontrollable reaction. Hot water of 50° C. was successively passed through the jacket for about more 0.5 hours to gelate the sol formed. The hardness of the gel thus obtained was 1.5 MPa.

Thereafter, the gel was rapidly taken out of the flask and squeezed through a nylon screen having a mesh opening of 600 μm to be crushed, thereby obtaining powdery wet gel (silica hydrogel). This hydrogel (450 g) and purified water (450 g) were charged into a 1-L glass-made autoclave and subjected to a hydrothermal treatment under conditions at 130° C. for 3 hours. The reaction mixture was then filtered through No. 5A filter paper. Without washing with water, the resultant filter cake was dried completely under reduced pressure at 100° C. to a constant weight to thereby obtain silica. The contents of metallic impurities in the thus-obtained silica sample were measured: sodium was 0.2 ppm, potassium was 0.1 ppm, calcium was 0.2 ppm, and none of magnesium, aluminum, titanium and zirconium were detected. Other physical properties of the silica are shown in Table V-1.

Separately from the measurement described above, the wide-angle X-ray scattering spectral pattern of the silica hydrogel was measured in the following manner. The silica hydrogel obtained above was immediately dried without subjecting it to the hydrothermal treatment in accordance with the method described above in the specification. The WAXS spectral pattern of this silica sample thus obtained was then measured. The result is shown in Table V-2.

Example V-2

A silica sample was obtained in the same manner as in Example V-1 except that the amount of water upon the hydrolysis in Example V-1 was changed to 1,333 g (molar ratio of water/tetramethoxysilane=8). Measurement results of physical properties thereof are shown in Table V-1. The measured result of WAXS spectral pattern of this silica sample is shown in Table V-2.

Comparative Example V-1

A silica sample was obtained in the same manner as in Example V-1 except that the amount of water upon the hydrolysis in Example V-1 was changed to 1,333 g (molar ratio of water/tetramethoxysilane=8), and that the temperature of the hot water passing through the jacket was kept at 30° C. until the gelling was completed. Measurement results of the physical properties thereof are shown in Table V-1.

The measured result of WAXS spectral pattern of the silica sample is shown in Table V-2.

Comparative Example V-2

A 0.3-L container was charged with 42 wt % sulfuric acid (56 g), and a mixture of water glass (JIS No. 3, product of Fuji Chemical Co., Ltd.; 1,000 g) and water (20 g) was added while the resultant mixture was vigorously stirred. The sol solution thus obtained was heated for 30 minutes in a constant-temperature bath adjusted to 50° C. to gelate sol. The gel was left to stand at room temperature for a day to age and squeezed through a nylon screen having a mesh opening of 600 μm to obtain powdery acidic silica hydrogel. This hydrogel was suction-filtered through No. 5A filter paper, and the resultant filter cake was washed until the filtrate became neutral, thereby obtained neutral silica hydrogel. This neutral silica hydrogel (20 g) and purified water (20 g) were charged into a 60 mL SUS microbomb and subjected to a hydrothermal treatment at 130° C. for 3 hours. The reaction mixture was then filtered through No. 5A filter paper. Without washing with water, the resultant filter cake was dried completely under reduced pressure at 100° C. The contents of metallic impurities in the thus-obtained silica sample were measured: sodium was 170 ppm, magnesium was 31 ppm, aluminum was 15 ppm, potassium was 23 ppm, calcium was 160 ppm, titanium was 260 ppm, and zirconium was 44 ppm. Other physical properties of the silica sample are shown in Tables V-1.

Separately before the hydrothermal treatment described above, the wide-angle X-ray scattering spectral pattern of the neutral silica hydrogel was measured in the same manner as in Example V-1. The result is shown in Table

TABLE V-1

|  | Ex. V-1 | Ex. V-2 | Comp. Ex. V-1 | Comp. Ex. V-2 |
|---|---|---|---|---|
| Total pore volume (ml/g) | 0.81 | 0.70 | 0.02 | 0.90 |
| Specific surface area ($m^2/g$) | 848 | 835 | 8 | 694 |
| $D_{max}$ (nm) | 3.9 | 3.9 | (Note 1) | 6.7 (Note 2) |
| Ration of the volume of the pores whose diameters are within a range of $D_{max} \pm 20\%$ to the total pore volume (%) | 60 | 51 | " | 27 |
| Differential pore volume at $D_{max}$ (ml/g) | 7.7 | 6.2 | " | 1.8 |
| $Q^4/Q^3$ | 1.7 | 1.5 | 1.3 | 1.5 |
| Specific surface area after a heat resistance test ($m^2/g$) | 468 | 320 | 0 | 35 |
| Specific surface area after a hydrothermal stability test ($m^2/g$) | 56 | 10 | 0 | 14 |

Note 1:
Immeasurable because no peak appeared.
Note 2:
Two peaks appeared, and a greater peak was selected.

TABLE V-2

|  | Example | | Comparative Example | |
|---|---|---|---|---|
|  | V-1 | V-2 | V-1 | V-2 |
| Peak in a region where the q value is $0.7 \leq$ q value $\leq 1.3$ | Appeared | Appeared | Not appeared | Not appeared |
| Peak in a region where the q value is $1.3 <$ q value $\leq 2.0$ | Appeared | Appeared | Appeared | Appeared |

[G] Example/Comparative Example Group VI:

(1) Analytical Method of Silica:
The analyses were conducted under the same conditions as in Example/Comparative Example Groups I to V.
(2) Preparation and Evaluation of Silica:

Examples VI-1

A 5-L separable flask (jacketed) equipped with a water-cooling condenser opened to the air at the upper part thereof was charged with pure water (1,000 g). While stirring at such a stirring speed that the speed of the edges of stirring blades is 2.5 m/s, tetramethoxysilane (1,400 g) was charged over 1 minute into the flask. A molar ratio of water to tetramethoxysilane was about 6. Hot water of 50° C. was passed through the jacket of the separable flask. The stirring was successively continued, and the temperature of the contents was kept at 60 to 70° C. so as not to run away. Hot water of 50° C. was successively passed through the jacket for about 0.5 hours to gelate the sol formed. The hardness of the gel thus obtained was 1.5 MPa.

Thereafter, the gel was rapidly taken out of the flask and squeezed through a nylon screen having a mesh opening of 600 μm to be crushed, thereby obtained powdery wet gel (silica hydrogel). This hydrogel (450 g) and purified water (450 g) were charged into a 1-L glass-made autoclave and subjected to a hydrothermal treatment under conditions at 130° C. for 3 hours. The reaction mixture was then filtered through No. 5A filter paper. Without washed with water, the resultant filter cakes were dried under reduced pressure at 100° C. to a constant weight to thereby obtain silica. The contents of metallic impurities in the thus-obtained silica were measured: sodium was 0.2 ppm, potassium was 0.1 ppm, calcium was 0.2 ppm, and none of magnesium, aluminum, titanium and zirconium were detected. Other physical properties of the silica are shown in Table VI-1.

Example V-2

Silica was obtained in the same manner as in Example VI-1 except that the charging time of tetramethoxysilane in Example VI-1 was changed to 3 minutes. Measurement results of physical properties thereof are shown in Table VI-1.

Comparative Example V-1

Silica was obtained in the same manner as in Example VI-1 except that the charging time of tetramethoxysilane in Example VI-1 was changed to 30 minutes. Measurement results of physical properties thereof are shown in Table VI-1.

Comparative Examples VI-2 and VI-3

Silica "G-3" and "G-6" (ground) among "CARIACT G series" silica for carrying a catalyst produced by Fuji Silysia Chemical Co. Ltd. were used as representatives of commercially available general silica for the sake of comparison with the silica according to the present invention to regard them as Comparative Examples VI-1 and VI-2, respectively. In this connection, the contents of metallic impurities in the commercially available silica ("G-6") were measured: sodium was 170 ppm, magnesium was 31 ppm, aluminum was 15 ppm, potassium was 23 ppm, calcium was 160 ppm, titanium was 260 ppm, and zirconium was 44 ppm. Other physical properties of the silica are shown in Table VI-1.

TABLE VI-1

|  | Example | | Comparative Example | | |
| --- | --- | --- | --- | --- | --- |
|  | VI-1 | VI-2 | VI-1 | VI-2 | VI-3 |
| Chemical shift of $Q^4$ peak (ppm) | −111.25 | −111.17 | −110.62 | −109.87 | −110.77 |
| Total pore volume (ml/g) | 0.90 | 0.85 | 0.61 | 0.53 | 0.91 |
| Specific surface area (m²/g) | 862 | 859 | 692 | 885 | 599 |
| $D_{max}$ (nm) | 4.0 | 3.9 | 3.6 | * | 6.6 |
| Ratio of the volume of the pores whose diameters are within a range of $D_{max} \pm 20\%$ to the total pore volume (%) | 65 | 61 | 52 | * | 48 |
| Differential pore volume at $D_{max}$ (ml/g) | 8.3 | 7.7 | 3.7 | * | 2.9 |
| $Q^4/Q^3$ | 1.8 | 1.7 | 1.5 | 1.4 | 2.6 |
| Specific surface area after a heat resistance test (m²/g) | 502 | 475 | 220 | 30 | 30 |
| Specific surface area after a hydrothermal stability test (m²/g) | 71 | 57 | 17 | 26 | 4 |

(*: Immeasurable because no peak appeared)

[H] Example/Comparative Example Group VII:

(1) Analytical Method of Silica:

The analyses were basically conducted under the same conditions as those for Example/Comparative Example Groups I to VI. Only analytical methods different from Example/Comparative Example Groups I to VI will hereinafter be described.

(1-17) Measurement of Particle Size Distribution:

An LMS-30 apparatus (dispersion medium: water) manufactured by SEISHIN ENTERPRISE CO., LTD. was used to measure the particle size distribution and mean particle diameter of each sample.

(1-18) Measurement of Crushing Strength:

Crushing strength per granule was measured using Kiya hardness tester manufactured by FUJIWARA Scientific Company (digital Kiya hardness tester: NO. KHT-20N).

(2) Preparation and Evaluation of Silica:

Examples VII-1

A 5-L glass-made separable flask (jacketed) equipped with a water-cooling condenser opened to the air at the upper part thereof was charged with pure water (1,000 g). While stirring at such a stirring speed that the speed of the edges of stirring blades is 2.5 m/s, tetramethoxysilane (1,400 g) was charged over 3 minutes into the flask. A molar ratio of water to tetramethoxysilane was about 6. Hot water of 50° C. was passed through the jacket of the separable flask. The stirring was successively continued and stopped at the time the temperature of the contents reached the boiling point. Hot water of 50° C. was successively passed through the jacket for about 0.5 hours to gelate the sol formed. Thereafter, the gel was rapidly taken out of the flask and squeezed through a nylon screen having a mesh opening of 600 µm to be crushed, thereby obtained powdery wet gel (silica hydrogel). This hydrogel (450 g) and purified water (450 g) were charged into a 1-L glass-made autoclave and subjected to a hydrothermal treatment under conditions at 150° C. for 3 hours. After the hydrothermal treatment was performed for the prescribed period of time, the reaction mixture was filtered through No. 5A filter paper. Without washing with water, the resultant filter cakes were dried under reduced pressure at 100° C. to a constant weight to thereby obtain a crude silica of Example VII-1. Various physical properties of the crude silica are shown in the following Tables VII-1.

The crude silica (mean particle diameter: 30 µm) of Example VII-1 was fed to an STJ-200 type jet mill manufactured by SEISHIN ENTERPRISE CO., LTD. at a feed rate of 20 kg/hr using a vertical screw feeder and preliminarily ground under an indentation pressure of 7 kg/cm² and a grinding pressure of 7 kg/cm² to provide particles having a mean particle diameter of 3 µm. The particles were collected using a filter fabric. A part (500 g) thereof was charged into a 2-L polyethylene container together with zirconia beads (2 kg) having a diameter of 0.5 mm and water (dispersion medium; 1 L) and finely ground at 100 rpm for 200 hours by a rolling ball mill. The zirconia beads were removed from the resultant slurry, and the remaining fine silica particles (primary particles) were fed to a granulating step as the slurry. The mean particle diameter of the fine silica particles was 0.26 µm.

The jet-mill-ground silica (100 g) obtained in the above manner was charged in a rotation plate (rotating speed: 30 rpm) that is kept at 60° C. The slurry (200 g, silica concentration 10 wt %) of the ball-mill-crushed silica obtained in the above-mentioned method, which silica is crushed by the ball mill, is gradually added with a spray to the rotation plate while the rotation plate is rotated.

When particles of several millimeters are observed by eye, the rotation is thence continued for 15 minutes. Classification was performed on the silica obtained in order to collect particles of 2 to 4 millimeters whereupon the collected particles was regarded as aggregates of fine silica particles.

Various physical properties of the aggregates of fine silica particles according to Example VII-1 are shown in Table VII-2. No peak attributable to periodic structure on the low-angle side (2θ≦5 deg) was observed on the powder X-ray diffraction patterns of the silica particle aggregates. The chemical shift value of $Q^4$ peak in solid-state Si NMR was smaller (present in a region on a more minus side) than a value calculated from the left side of the inequality (I) ($-0.0705 \times (D_{max}) - 110.36 > \delta$). The pore distribution curve thereof was very sharp, and the deterioration of pore properties was slight even in the fine grinding and granulating step. As metallic impurities, mixing of zirconia and aluminum in the fine grinding and granulating step was only observed, and the total content thereof was as very low as 2.3 ppm, and so the aggregates were highly pure. Since the value of crushing strength was not greater than 100 N, it is considered that the aggregates of fine silica particles according to Example VII-1 can be suitably used as, for example, a carrier for an olefin polymerization catalyst.

Example VII-1

Another slurry was prepared by adding the jet-mill-crushed silica obtained in Example VII-1 to the slurry of ball-mill-crushed silica also obtained in Example VII-1. The volume of the jet-mill-crushed silica that was added was three times of dried weight of the silica in the slurry. The prepared silica slurry was used as raw material to conduct granulation using a disk atomizer type spray dryer under conditions of parallel flow contact-system, a hot air inlet temperature of 200° C., a hot air outlet temperature of 95° C., a disk rotation speed of 10,000 rpm, and a slurry concentration of 34 wt %. As a result, translucent, spherical aggregate particles (aggregates of fine silica particles according to Example VII-2) having particles diameters of 45 to 150 μm.

Thus-obtained silica had passed through in turn the spray drier, a pipe, and a cyclone. The silica formed via the series of apparatus was observed with an optical microscope, which observation revealed that the silica includes a little amount of crushed particles. That indicates that, for example, when the silica is used as a carrier for an olefin polymerization catalyst, the silica causes less damage, such as abrasion, to an extrusion forming apparatus used for formation of polymers obtained by the polymerization, a screw of an injection molder, and a container through which the polymers pass. Clearly, the silica is therefore suitable for industrial purposes.

Furthermore, it is easily expect that the properties of the pores of the silica obtained affects on activity and distribution of an olefin polymerization favorably. The silica according to the present invention can be easily crushed with fingers, being preferable because of its moderate strength.

Comparative Example VII-1

An experiment was performed under the same conditions as those for Example VII-1 except that silica CARIACT G-6 (10 μm grade) produced by Fuji Silysia Chemical Co., Ltd. was used as a crude silica (silica material of Comparative Example VII-1). The resultant aggregate particles (aggregates of fine silica particles according to Comparative Example VII-1) were translucent, spherical aggregate particles having a particle diameter of 45 to 150 μm, whose primary particles had a mean particle diameter of 0.23 μm.

Various physical properties of the crude silica of Comparative Example VII-1 and the aggregate of fine silica particles (silica aggregate) according to Comparative Example VII-1 are shown in Tables VII-1 and VII-2, respectively. No peak attributable to periodic structure on the low-angle side (2θ≦5 deg) was observed on the powder X-ray diffraction patterns. The pore distribution curve thereof was not very sharp compared with the silica aggregate according to Example VII-1, and the degree of deterioration of pore properties in the fine grinding and granulating step was somewhat great compared with the silica aggregate according to Example VII-1. Because the content of metallic impurities in the silica aggregate of Comparative Example VII-1 was very high compared with the silica aggregate of Example VII-1, it is expected that the heat-resisitance and water resisitance of the silica aggregate of Comparative Example VII-1 are lower compared with the silica aggregate of Example VII-1. The chemical shift value of a $Q^4$ peak in solid-state Si NMR in Comparative Example VII-1 was greater (present in a region on a more plus side) compared with a value calculated from the left side of the inequality (I). It is thus considered that the silica aggregate of Comparative Example VII-1 has highly distorted structure compared with the silica aggregate of Example VII-1, and therefore tends to undergo changes of physical properties.

TABLE VII-1

| | Ex. VII-1 | Comp. Ex. VII-1 | Ex. VII-2 |
|---|---|---|---|
| Mode diameter $D_{max}$ (nm) | 6.9 | 6.6 | 6.9 |
| Differential pore volume at $D_{max}$ (ml/g) | 11 | 3 | 11 |
| Specific surface area (m²/g) | 706 | 599 | 706 |
| Total pore volume (ml/g) | 1.19 | 0.91 | 1.19 |
| Rateio of the volume of the pores whose diameters are within a range of $D_{max}$ ± 20% to the total pore volume (%) | 69 | 48 | 69 |

TABLE VII-2

| | Ex. VII-1 | Comp. Ex. VII-1 | Ex. VII-2 |
|---|---|---|---|
| Mode diameter $D_{max}$ (nm) | 6.7 | 6.6 | 6.4 |
| Differential pore volume at $D_{max}$ (ml/g) | 10 | 2 | 8 |
| Specific surface area (m²/g) | 652 | 483 | 632 |
| Total pore volume (ml/g) | 1.03 | 0.76 | 1.01 |
| Rateio of the volume of the pores whose diameters are within a range of $D_{max}$ ± 20% to the total pore volume (%) | 62 | 39 | 60 |
| Content of metallic impurities (ppm) | 2.2 | 706 | 2.4 |
| −0.0705 × ($D_{max}$) − 110.36 (ppm) | −110.83 | −110.75 | −110.81 |
| Chemical shift value of $Q^4$ peak (ppm) | −111.35 | −110.73 | −111.34 |
| $Q^4/Q^3$ | 2.3 | 2.6 | 2.4 |
| Crushing strength (kgf) | 15 | 17 | — |
| Mean particle diameter (μm) | 3.5 | 3.2 | 0.075 |

[I] Example/Comparative Example Group VIII:

(1) Analytical Method of Silica:

The analyses were basically conducted under the same conditions as those for Example/Comparative Example Groups I to VII. Only an analytical method different from Example/Comparative Example Groups I to VII will hereinafter be described.

(1-19) Determination of Ratio of Minor Diameter/Major Diameter:

A stereomicroscope was used to take a photograph by adjusting a field of view in such a manner that 20 silica gel particles are contained in the field of view. The minimum diameter and maximum diameter of each particle are regarded as minor and major diameters, respectively, to calculate out a ratio of minor diameter/major diameter, and an average value as to the 20 particles was found to provide this value as data.

(2) Preparation and Evaluation of Silica:

Examples VII-1

A 0.3-L glass-made separable flask (jacketed) equipped with a water-cooling condenser opened to the air at the upper part thereof was charged with pure water (104 g). While stirring at such a stirring speed that the speed of the edges of stirring blades is 2.5 m/s, tetramethoxysilane (146 g) was charged into the flask. A molar ratio of water to tetramethoxysilane was about 6. Hot water of 50° C. was passed through the jacket of the separable flask. The stirring was successively continued and stopped at the time the temperature of the contents reached the boiling point. At this point of time, the reaction mixture became a uniform solution. After confirming that rapid heat generation came to an end, the resultant sol solution was immediately taken out of the separable flask. The sol solution was immediately used for the subsequent reactions.

A 5-L glass-made separable flask (jacketed) equipped with a water-cooling condenser opened to the air at the upper part thereof was charged with a solution composed of cyclohexane (3,000 ml) and ethyl cellulose [EC-T100, product of Hercules Co.; 7.0 g (0.3 wt %)]. Hot water of 50° C. was passed through the jacket of the separable flask. While keeping the cyclohexane solution at 50° C. and stirring at such a stirring speed that the speed of the edges of stirring blades is 10 m/s, the above-prepared sol solution (250 g) was charged into the flask to form emulsion particles (droplets). While successively continuing the stirring, the emulsion particles was held at 50° C. for 1 hour so as to be gelated, thereby spherical silica hydrogel was provided. The number of stirring blades is eight, b/D=0.1, and θ=90°.

This stirring was stopped, and the resultant spherical silica hydrogel was taken out by solid-liquid separation by filtration. After this hydrogel was first washed with hot cyclohexane heated to 50° C. and then with a liquid mixture containing methanol and water at a weight ratio of 60:40 to almost remove cyclohexane and ethyl cellulose attached to the surfaces of the particles, truly spherical silica hydrogel particles free of aggregate were obtained by solid-liquid separation by filtration.

The spherical silica hydrogel (250 g) and purified water (250 g) were charged into a 1-L glass-made autoclave and subjected to a hydrothermal treatment at 150° C. for 3 hours. After the hydrothermal treatment was performed, the reaction mixture was subjected to liquid-solid separation by filtration, and the resultant filter cake was dried completely under reduced pressure at 100° C. The dried silica particles were calcined at 500° C. for 5 hours to obtain spherical silica particles having a particle diameter of 5 to 100 μm. This product was regarded as silica according to Example VIII-1.

Various physical properties of the silica sample according to Example VIII-1 are shown in the following Tables VIII-1. No peak attributable to crystallinity appeared on the powder X-ray diffraction pattern of the silica sample, and no peak attributable to periodic structure was observed on the low-angle side. With respect to the contents of metallic impurities in the spherical silica sample according to Example VIII-1, sodium was 0.2 ppm, potassium was 0.1 ppm, and calcium was 0.2 ppm, and any other metallic impurities were not detected. The chemical shift value δ of $Q^4$ peak of this sample in solid-state Si NMR was smaller than the value calculated from the left side of the inequality (I).

Example VIII-2

An experiment was performed in the same manner as in Example VIII-1 except that the temperature of the hydrothermal treatment was changed to 200° C. The resultant spherical silica particles were regarded as silica sample according to Example VIII-2. Various physical properties of the silica sample according to Example VIII-2 are shown in the following Tables VIII-1. No peak attributable to crystallinity appeared on the powder X-ray diffraction pattern of the silica sample, and no peak attributable to periodic structure was observed on the low-angle side. With respect to the contents of metallic impurities in the silica sample according to Example VIII-2, sodium was 0.2 ppm, potassium was 0.1 ppm, and calcium was 0.2 ppm, and any other metallic impurities were not detected. The chemical shift value δ of $Q^4$ peak of this sample in solid-state Si NMR was smaller than the value calculated from the left side of the inequality (I).

Comparative Example VIII-1

Silica CARIACT Q-15 (spherical, particle diameter: 75 to 500 μm) produced by Fuji Silysia Chemical Co., Ltd. was used as silica sample of Comparative Examples VIII-1. Various physical properties thereof are shown in the following Table VIII-1. No peak attributable to crystallinity appeared on the powder X-ray diffraction pattern of the silica sample, and no peak attributable to periodic structure was observed on the low-angle side. With respect to the contents of metallic impurities in the silica sample of Comparative Examples VIII-1: sodium was 35 ppm, magnesium was 0.83 ppm, aluminum was 17 ppm, potassium was 2 ppm, calcium was 3.3 ppm, titanium was 110 ppm, iron was 10.3 ppm, and zirconium was 11 ppm, and so the total content of the metallic impurities could be said high. The chemical shift value δ of $Q^4$ peak of this sample in solid-state Si NMR was greater than any other values of silica samples of Examples VIII-1 and VIII-2 and present in a region larger than the value calculated from the left side of the inequality (I). It is thus judged that the silica sample of Comparative Examples VIII-1 has highly distorted structure compared with the silica samples according to Examples VII-1 and VIII-2, and therefore tends to readily undergo changes of physical properties.

The silica samples of Examples VII-1 and VIII-2 and Comparative Example VII-1 were subjected to a hydrothermal stability test under the above-described conditions and the specific surface areas thereof were measured, the results are shown in Table VIII-1. The silica sample of Examples VIII-1 and VIII-2 had less loss in specific surface areas compared with the silica sample of Comparative Example VIII-1, and thus can be judged to be more stable.

TABLE VIII-1

|  | Ex. VIII-1 | Ex. VIII-2 | Comp. Ex. VIII-1 |
|---|---|---|---|
| Mode diameter $D_{max}$ (nm) | 7.1 | 12.6 | 16.5 |
| Differential pore volume at $D_{max}$ (ml/g) | 10.3 | 11.8 | 8.4 |
| Specific surface area (m²/g) | 649 | 370 | 204 |
| Total pore volume (ml/g) | 1.50 | 1.80 | 1.08 |
| Ratio of minor diameter/major diameter | 1.00 | 1.00 | 1.00 |
| Ratio of the volume of the pores whose diameters are within a range of $D_{max}$ ± 20% to the total pore volume (%) | 70 | 74 | 60 |
| $Q^4/Q^3$ | 2.8 | 4.1 | 3.6 |
| Chemical shift δ of $Q^4$ peak (ppm) | −111.5 | −111.66 | −111.48 |
| <−0.0705 × ($D_{max}$) − 110.36 (ppm)> | <−110.89> | <−111.29> | <−111.57> |
| Contents of all metallic impurities (ppm) | 0.5 | 0.5 | 189.4 |
| Specific surface area after a hydrothermal stability test (m²/g) | 50 | 61 | 10 |

What is claimed is:

1. A silica produced through a process of stirring water phase and silicon alkoxide phase with stirring blades whose circumferential speed is between 0.05 and 10 m/s,
wherein a mode pore diameter ($D_{max}$) of said silica is 20 nm or less, and
wherein a solid-state Si nuclear magnetic resonance (hereinafter called solid-state Si NMR) spectrum of said silica includes a chemical shift ($\delta$ ppm) of $Q^4$ peak meeting the following inequality $-0.0705 \times (D_{max}) - 110.36 > \delta$.

2. A silica according to claim 1, wherein said mode pore diameter ($D_{max}$) is 10 nm or less, and a total of S, Cl, and N contents in said silica is 10 ppm or less.

3. A silica according to claim 1, wherein in a profile obtained by a Guinier plot ((a scattering intensity of X-ray)–q2 value) of a small-angle X-ray scattering (hereinafter called SAXS) spectrum of said silica, there is no inflection point in a region where q2 value is $6 \times 10^{-3}$ ($Å^{-2}$) or less.

4. A silica according to claim 3, wherein said mode pore diameter ($D_{max}$) is 17 nm or less.

5. A silica according to claim 1, wherein a X-ray transmittance T of said silica and said mode pore diameter ($D_{max}$) meet the inequality $0 < T < 4.98 \ln(D_{max})$.

6. A silica according to claim 1, wherein:
said silica is produced through a hydrothermal treatment of a silica hydrogel followed by drying; and
when said silica hydrogel is dried without undergoing hydrothermal treatment, said silica hydrogel is transformed into a silica gel having a wide-angle X-ray scattering (hereinafter called WAXS) spectrum which includes a pair of peaks at a region of $0.7 \leq q$ value $\leq 1.3$ and at a region of $1.3 < q$ value $\leq 2.0$, respectively.

7. A silica according to claim 6, wherein said silica hydrogel has a fracture stress of 6 MPa or less.

8. A silica according to claim 1, wherein said chemical shift $\delta$ (ppm) of $Q^4$ peak is between −111.00 and −112.00 ppm.

9. A silica according to claim 1, wherein said silica has the form of aggregate of fine particles whose crushing strength per granule is 100 N or less.

10. A silica according to claim 9, wherein said silica gel is produced by the method comprising the steps of hydrolyzing a silicon alkoxide to obtain a raw silica, crushing the raw silica to fine particles, and aggregating the particulates to granulate into the aggregate.

11. A silica according to claim 1, wherein a ratio of major diameter and minor diameter of said silica is between 0.9 and 1.

12. A silica according to claim 11, wherein:
a pore volume is between 0.3 and 1.6 ml/g;
a specific surface area is between 200 and 1000 m²/g; and
a percentage of a total volume of pores whose diameters are within the range of $D_{max} \pm 20\%$ to a total pore volume is 50% or more.

13. A silica according to claim 12, wherein said silica has a spherical or substantially spherical shape.

14. A silica according to one of claims 1–13, wherein a pore volume is between 0.6 and 1.6 ml/g.

15. A silica according to claim 14, wherein said pore volume is between 0.7 and 1.6 ml/g.

16. A silica according to one of claims 1–13, wherein a specific surface area is between 250 and 1000 m²/g.

17. A silica according to claim 16, wherein said specific surface area is between 250 and 900 m²/g.

18. A silica according to one of claims 1–11, wherein a percentage of a total volume of pores whose diameters are within the range of $D_{max} \pm 20\%$ to a total volume of all pores is 50% or more.

19. A silica according to claim 18, wherein the percentage of a total volume of the pores whose diameters are within the range of $D_{max} \pm 20\%$ is 60% or more.

20. A silica according to one of claims 1–11, wherein a total content of metal impurities is 500 ppm or less.

21. A silica according to one of claims 1–13, wherein a total content of alkali metal and alkaline-earth metal impurities is 300 ppm or less.

22. A silica according to one of claims 1–12, wherein a differential pore volume at the mode pore diameter ($D_{max}$) is between 2 and 20 ml/g.

23. A silica according to one of claims 1–13, wherein a value of $(Q^4)/(Q^3)$ in the solid-state NMR spectrum is 1.3 or more.

24. A silica according to one of claims 1–8 and 11–13, wherein a mean diameter of said silica is 50 µm or less.

25. A silica according to claim 24, wherein the mean diameter is 500 µm or more.

26. A silica according to one of claims 1–13, wherein said silica gel is produced through hydrolysis process of a silicon alkoxide.

27. A silica according to claim 26, wherein said silica is produced by a method comprising the steps of:
hydrolyzing a silicon alkoxide to obtain a silica hydrosol while condensing the silica hydrosol to thereby form a silica hydrogel; and
carrying out a hydrothermal-treatment of the silica hydrogel subsequently to said hydrolyzing/condensing step without aging the silica hydrogel.

28. A silica according to claim 27, wherein said hydrolyzing/condensing step is carried out in the absence of any catalyst.

* * * * *